US011131423B2

(12) United States Patent
Anderson et al.

(10) Patent No.: US 11,131,423 B2
(45) Date of Patent: Sep. 28, 2021

(54) DISPLAY SUPPORT ARM ASSEMBLY FOR MOUNTING A DISPLAY

(71) Applicant: Southco, Inc., Concordville, PA (US)

(72) Inventors: Glenn Eric Anderson, Malvern, PA (US); Benjamin Gerald Lindo, Philadelphia, PA (US); Richard B. Langkamp, Jr., Hemlock, NY (US)

(73) Assignee: Southco, Inc., Concordville, PA (US)

( * ) Notice: Subject to any disclaimer, the term of this patent is extended or adjusted under 35 U.S.C. 154(b) by 197 days.

(21) Appl. No.: 16/082,332

(22) PCT Filed: Mar. 7, 2017

(86) PCT No.: PCT/US2017/021144
§ 371 (c)(1),
(2) Date: Sep. 5, 2018

(87) PCT Pub. No.: WO2017/155987
PCT Pub. Date: Sep. 14, 2017

(65) Prior Publication Data
US 2019/0086022 A1 Mar. 21, 2019

Related U.S. Application Data

(60) Provisional application No. 62/304,617, filed on Mar. 7, 2016.

(51) Int. Cl.
*E04G 3/00* (2006.01)
*F16M 11/10* (2006.01)
(Continued)

(52) U.S. Cl.
CPC ......... *F16M 11/10* (2013.01); *F16M 11/2014* (2013.01); *F16M 11/2021* (2013.01);
(Continued)

(58) Field of Classification Search
CPC .... F16M 11/10; F16M 11/24; F16M 11/2014; F16M 11/2021; F16M 11/2092; F16M 2200/024; F16M 2200/044
(Continued)

(56) References Cited

U.S. PATENT DOCUMENTS

| 1,220,578 A | 3/1917 | Wise |
| 1,318,703 A | 10/1919 | Stuchlak |

(Continued)

FOREIGN PATENT DOCUMENTS

| CN | 101184951 A | 5/2008 |
| CN | 201115151 Y | 9/2008 |

(Continued)

OTHER PUBLICATIONS

Communication pursuant to Article 94(3) EPC for European Application No. 17 712 341.1, dated Jan. 27, 2020, 3 pages.

(Continued)

*Primary Examiner* — Todd M Epps
(74) *Attorney, Agent, or Firm* — RatnerPrestia

(57) ABSTRACT

Aspects of the present invention provide a display support arm assembly that includes a proximal housing supporting at least one proximal shaft, a distal housing spaced from the proximal housing and supporting at least one distal shaft, and at least one link extending from the at least one proximal shaft to the at least one distal shaft. The at least one link is coupled for pivotal movement about an axis of the at least one proximal shaft. The display support assembly also includes a gas strut extending between the proximal housing and the distal housing. The gas strut provides substantially constant force throughout a range of the vertical adjustment of the display support arm. The display support assembly further includes at least one torque element associated with either or both of the at least one proximal shaft and the at (Continued)

least one distal shaft. The at least one torque element providing force throughout the range of the vertical adjustment of the display support arm, wherein the force is adjustable by adding or subtracting the number of the at least one torque element.

9 Claims, 15 Drawing Sheets

(51) Int. Cl.
 *F16M 11/20* (2006.01)
 *F16M 11/24* (2006.01)
(52) U.S. Cl.
 CPC ......... *F16M 11/2092* (2013.01); *F16M 11/24* (2013.01); *F16M 2200/024* (2013.01); *F16M 2200/044* (2013.01)
(58) Field of Classification Search
 USPC ......... 248/276.1, 274.1, 309.1, 284.1, 282.1, 248/122.1, 123.11
 See application file for complete search history.

(56) References Cited

U.S. PATENT DOCUMENTS

| | | |
|---|---|---|
| 2,033,715 A | 3/1936 | Jacob |
| 2,137,004 A | 11/1938 | Langsner |
| 2,256,241 A | 9/1941 | De Lisle |
| 2,332,967 A | 10/1943 | Fatkin |
| 2,424,840 A | 7/1947 | Murphy |
| 3,240,925 A | 3/1966 | Paschke et al. |
| 3,279,074 A | 10/1966 | McQuaid |
| 3,401,568 A | 9/1968 | Blatt |
| 3,952,984 A | 4/1976 | Dimitry |
| 3,955,241 A | 5/1976 | Little |
| 4,082,244 A | 4/1978 | Groff |
| 4,236,272 A | 12/1980 | Gronbach et al. |
| 4,356,594 A | 11/1982 | Grosemans |
| 4,402,481 A | 9/1983 | Sasaki |
| 4,403,423 A | 9/1983 | Ford et al. |
| 4,548,373 A | 10/1985 | Komura |
| 4,562,987 A | 1/1986 | Leeds et al. |
| 4,583,775 A | 4/1986 | Bisbing |
| 4,621,782 A | 11/1986 | Carlson et al. |
| 4,671,547 A | 6/1987 | Weinerman |
| 4,687,167 A | 8/1987 | Skalka et al. |
| 4,695,024 A | 9/1987 | Haven |
| 4,821,159 A | 4/1989 | Pike |
| 4,861,107 A | 8/1989 | Vidwans et al. |
| 4,878,367 A | 11/1989 | Bisbing |
| 4,897,015 A | 1/1990 | Abbe et al. |
| 4,928,914 A | 5/1990 | Snodell |
| 5,064,340 A | 11/1991 | Genov et al. |
| 5,079,799 A | 1/1992 | Rude et al. |
| 5,127,617 A | 7/1992 | Bergetz |
| 5,201,896 A | 4/1993 | Kruszewski |
| 5,231,734 A | 8/1993 | Rude |
| 5,246,240 A | 9/1993 | Romich et al. |
| 5,251,859 A | 10/1993 | Cyrell et al. |
| 5,257,767 A | 11/1993 | McConnell |
| 5,348,260 A | 9/1994 | Acevedo |
| 5,405,117 A | 4/1995 | Davis |
| 5,487,524 A | 1/1996 | Bergetz |
| 5,491,874 A | 2/1996 | Lowry et al. |
| 5,564,163 A | 10/1996 | Lowry et al. |
| 5,566,048 A | 10/1996 | Esterberg et al. |
| 5,597,303 A | 1/1997 | Allan |
| 5,697,125 A | 12/1997 | Gannon |
| 5,738,316 A | 4/1998 | Sweere et al. |
| 5,743,503 A | 4/1998 | Voeller et al. |
| 5,752,293 A | 5/1998 | Lowry et al. |
| 5,771,539 A | 6/1998 | Wahlstedt et al. |
| 5,771,540 A | 6/1998 | Carpenter et al. |
| 5,787,549 A | 8/1998 | Soderlund |
| 5,790,910 A | 8/1998 | Haskin |
| 5,799,917 A | 9/1998 | Li |
| 5,832,987 A | 11/1998 | Lowry et al. |
| 5,842,672 A | 12/1998 | Sweere et al. |
| 5,860,335 A | 1/1999 | Lund |
| 5,876,008 A | 3/1999 | Sweere et al. |
| 5,878,674 A | 3/1999 | Allan |
| 5,918,841 A | 7/1999 | Sweere et al. |
| 5,924,665 A | 7/1999 | Sweere et al. |
| 5,934,636 A | 8/1999 | Cyrell |
| 5,947,428 A | 9/1999 | Sweere et al. |
| 5,961,162 A | 10/1999 | Glaser et al. |
| 5,967,479 A | 10/1999 | Sweere et al. |
| 5,975,195 A | 11/1999 | Lowry et al. |
| 5,975,472 A | 11/1999 | Hung |
| 5,992,809 A | 11/1999 | Sweere et al. |
| 6,012,693 A | 1/2000 | Voeller et al. |
| 6,015,120 A | 1/2000 | Sweere et al. |
| 6,019,332 A | 2/2000 | Sweere et al. |
| D423,745 S | 4/2000 | Theis et al. |
| 6,058,752 A | 5/2000 | Feder |
| 6,095,468 A | 8/2000 | Chirico et al. |
| 6,102,350 A | 8/2000 | Cyrell |
| 6,141,831 A | 11/2000 | Novin et al. |
| 6,182,330 B1 | 2/2001 | Novin et al. |
| 6,189,849 B1 | 2/2001 | Sweere et al. |
| 6,227,508 B1 | 5/2001 | Panzarella et al. |
| 6,233,791 B1 | 5/2001 | Theis |
| 6,301,748 B1 | 10/2001 | Su-Man |
| 6,347,433 B1 | 2/2002 | Novin et al. |
| 6,354,549 B2 | 3/2002 | Sweere et al. |
| 6,367,756 B1 | 4/2002 | Wang |
| 6,394,403 B1 | 5/2002 | Hung |
| 6,409,134 B1 | 6/2002 | Oddsen |
| 6,419,196 B1 | 7/2002 | Sweere et al. |
| 6,467,129 B1 | 10/2002 | Bae |
| 6,478,274 B1 | 11/2002 | Oddsen |
| 6,588,062 B2 | 7/2003 | Novin et al. |
| D478,088 S | 8/2003 | Hamouz |
| 6,609,691 B2 | 8/2003 | Oddsen |
| 6,619,606 B2 | 9/2003 | Oddsen |
| 6,640,592 B2 | 11/2003 | Vickers |
| D488,708 S | 4/2004 | Lam et al. |
| D489,599 S | 5/2004 | Lam |
| 6,732,988 B2 | 5/2004 | Ihalainen et al. |
| 6,736,364 B2 | 5/2004 | Oddsen |
| 6,775,884 B2 | 8/2004 | Su-Man |
| 6,791,601 B1 | 9/2004 | Chang et al. |
| D497,537 S | 10/2004 | O'Keene et al. |
| 6,871,384 B2 | 3/2005 | Novin et al. |
| 6,883,764 B1 | 4/2005 | Mileos et al. |
| D505,858 S | 6/2005 | O'Keene |
| 6,905,101 B1 | 6/2005 | Dittmer |
| 6,915,994 B2 | 7/2005 | Oddsen |
| 6,915,995 B2 | 7/2005 | Gillespie |
| 6,973,688 B2 | 12/2005 | Barker et al. |
| 6,997,422 B2 | 2/2006 | Sweer et al. |
| 7,014,157 B2 | 3/2006 | Oddsen |
| 7,028,961 B1 | 4/2006 | Dittmer et al. |
| 7,032,870 B2 | 4/2006 | Sweere et al. |
| 7,048,242 B2 | 5/2006 | Oddsen |
| 7,055,215 B1 | 6/2006 | Ligtenberg et al. |
| 7,065,834 B2 | 6/2006 | Lowry et al. |
| 7,079,874 B2 | 7/2006 | Pontoppidan et al. |
| 7,099,148 B2 | 8/2006 | Lee |
| D530,595 S | 10/2006 | Lam et al. |
| 7,152,836 B2 | 12/2006 | Pfister et al. |
| D537,323 S | 2/2007 | Saez |
| 7,175,152 B2 | 2/2007 | Dittmer |
| 7,177,144 B2 | 2/2007 | Ha et al. |
| 7,178,774 B2 | 2/2007 | Kim |
| 7,178,775 B2 | 2/2007 | Pfister et al. |
| D537,706 S | 3/2007 | Ly Hau et al. |
| D538,140 S | 3/2007 | Ly Hau et al. |
| D538,141 S | 3/2007 | Stenhouse et al. |
| D538,632 S | 3/2007 | Ly Hau et al. |
| D538,633 S | 3/2007 | Ly Hau et al. |
| D539,123 S | 3/2007 | Ly Hau et al. |

(56) References Cited

U.S. PATENT DOCUMENTS

| | | | |
|---|---|---|---|
| D539,125 S | 3/2007 | Ly Hau et al. | |
| D539,126 S | 3/2007 | Stenhouse et al. | |
| D539,127 S | 3/2007 | Ly Hau et al. | |
| D539,128 S | 3/2007 | Ly Hau et al. | |
| D539,566 S | 4/2007 | Anderson | |
| D539,636 S | 4/2007 | Bremmon | |
| D539,637 S | 4/2007 | Ly Hau et al. | |
| D540,154 S | 4/2007 | Bremmon | |
| D540,332 S | 4/2007 | Dittmer et al. | |
| 7,207,537 B2 | 4/2007 | Hung | |
| D543,210 S | 5/2007 | Stenhouse et al. | |
| D543,547 S | 5/2007 | Muday et al. | |
| D543,548 S | 5/2007 | Muday et al. | |
| 7,243,892 B2 | 7/2007 | Pfister | |
| 7,246,780 B2 | 7/2007 | Oddsen | |
| 7,252,277 B2 | 8/2007 | Sweere et al. | |
| 7,303,173 B2 | 12/2007 | Mileos | |
| 7,334,765 B2 | 2/2008 | Hwang | |
| 7,338,022 B2 * | 3/2008 | Hung | F16M 11/041 248/278.1 |
| 7,345,870 B2 | 3/2008 | Shin | |
| 7,364,127 B2 | 4/2008 | Huang | |
| 7,380,760 B2 | 6/2008 | Dittmer | |
| 7,387,286 B2 | 6/2008 | Dittmer et al. | |
| 7,389,965 B2 * | 6/2008 | Oddsen, Jr. | F16M 11/10 248/274.1 |
| 7,395,995 B2 * | 7/2008 | Chen | F16M 11/105 248/284.1 |
| 7,395,996 B2 | 7/2008 | Dittmer | |
| 7,398,950 B2 | 7/2008 | Hung | |
| 7,441,427 B2 | 10/2008 | Vickers | |
| 7,458,549 B2 | 12/2008 | Oddsen | |
| 7,472,458 B2 | 1/2009 | Oddsen | |
| 7,487,943 B1 | 2/2009 | Gillespie | |
| 7,497,408 B2 | 3/2009 | Lim et al. | |
| 7,506,853 B2 | 3/2009 | Sweere et al. | |
| 7,513,474 B2 | 4/2009 | Anderson et al. | |
| 7,530,123 B2 | 5/2009 | Cao et al. | |
| 7,540,457 B2 * | 6/2009 | Oddsen, Jr. | F16M 11/105 248/278.1 |
| 7,546,994 B2 | 6/2009 | Altonji et al. | |
| 7,567,436 B2 | 7/2009 | Jeong | |
| 7,571,883 B2 | 8/2009 | Van Groesen et al. | |
| 7,593,218 B2 | 9/2009 | Hwang et al. | |
| 7,604,210 B2 * | 10/2009 | Oddsen, Jr. | F16M 11/105 248/280.11 |
| 7,663,699 B2 | 2/2010 | Sakata et al. | |
| 7,673,838 B2 | 3/2010 | Zhang et al. | |
| 7,679,892 B2 | 3/2010 | Jung | |
| 7,690,605 B2 | 4/2010 | Lee et al. | |
| 7,690,611 B2 | 4/2010 | Asamarai et al. | |
| 7,694,927 B2 * | 4/2010 | Chuang | F16M 11/041 248/276.1 |
| 7,717,383 B2 | 5/2010 | Russell | |
| 7,748,666 B2 * | 7/2010 | Oddsen, Jr. | F16M 13/02 248/123.11 |
| 7,766,288 B2 | 8/2010 | Kim et al. | |
| 7,775,485 B2 | 8/2010 | Asai et al. | |
| 7,793,903 B2 | 9/2010 | Dittmer et al. | |
| 7,806,378 B2 | 10/2010 | Oddsen | |
| 7,810,773 B2 | 10/2010 | Chi | |
| 7,815,154 B2 | 10/2010 | Oh et al. | |
| 7,823,849 B2 | 11/2010 | Dittmer et al. | |
| 7,832,700 B2 | 11/2010 | Ciungan | |
| 7,841,569 B2 | 11/2010 | Mileos et al. | |
| 7,841,570 B2 | 11/2010 | Mileos et al. | |
| D631,445 S | 1/2011 | Dittmer et al. | |
| 7,861,998 B2 | 1/2011 | Huang | |
| 7,866,622 B2 | 1/2011 | Dittmer | |
| 7,887,014 B2 | 2/2011 | Lindblad et al. | |
| 7,922,137 B2 | 4/2011 | Derry et al. | |
| 7,954,780 B2 | 6/2011 | Dittmer | |
| 7,975,976 B2 | 7/2011 | Wohlford | |
| 7,992,832 B2 | 8/2011 | Zhang et al. | |
| D644,648 S | 9/2011 | Anderson et al. | |
| 8,056,874 B2 | 11/2011 | Goodwin et al. | |
| 8,070,114 B2 * | 12/2011 | Chen | F16M 11/14 248/121 |
| 8,070,120 B2 | 12/2011 | Lange et al. | |
| 8,074,949 B2 * | 12/2011 | Oddsen, Jr. | F16M 11/2014 248/276.1 |
| 8,094,438 B2 | 1/2012 | Dittmer et al. | |
| D655,297 S | 3/2012 | Magnusson | |
| D660,845 S | 5/2012 | Schmauch et al. | |
| 8,191,487 B2 | 6/2012 | Theesfeld et al. | |
| 8,228,668 B2 | 7/2012 | Asamarai et al. | |
| 8,254,092 B2 | 8/2012 | Russell et al. | |
| 8,256,729 B2 | 9/2012 | Koch et al. | |
| 8,310,468 B2 | 11/2012 | Martin | |
| 8,328,151 B2 * | 12/2012 | Gwag | F16M 11/2092 248/284.1 |
| 8,336,840 B2 | 12/2012 | Song et al. | |
| 8,359,982 B2 | 1/2013 | Lebel et al. | |
| 8,366,060 B2 * | 2/2013 | Hung | F16M 11/041 248/124.1 |
| 8,469,323 B1 * | 6/2013 | Deros | F16M 13/022 248/278.1 |
| 8,490,934 B2 | 7/2013 | Dittmer | |
| 8,508,918 B2 | 8/2013 | Dittmer et al. | |
| 8,525,939 B2 | 9/2013 | Perez Perez et al. | |
| 8,561,955 B2 | 10/2013 | Stemple | |
| 8,693,172 B2 | 4/2014 | Russell et al. | |
| 8,720,838 B2 * | 5/2014 | Bowman | F16M 13/022 248/292.13 |
| 8,733,722 B2 | 5/2014 | Hung | |
| 8,837,127 B2 | 9/2014 | Dittmer et al. | |
| 8,870,140 B2 | 10/2014 | Stemple | |
| 8,888,062 B2 | 11/2014 | Novin | |
| 8,931,748 B2 | 1/2015 | Bowman et al. | |
| 9,022,339 B2 | 5/2015 | Borg et al. | |
| 9,062,816 B2 | 6/2015 | Kulkarni et al. | |
| 9,103,489 B2 | 8/2015 | Gwag | |
| 9,121,543 B2 | 9/2015 | Dittmer et al. | |
| 9,228,696 B2 | 1/2016 | Borloz et al. | |
| 9,243,743 B2 | 1/2016 | Hunter et al. | |
| 9,266,243 B2 * | 2/2016 | Swartz | F16M 11/24 |
| 9,274,550 B2 | 3/2016 | Mau et al. | |
| 9,279,536 B2 | 3/2016 | Dittmer et al. | |
| 9,298,254 B2 | 3/2016 | Ha et al. | |
| 9,355,219 B2 | 5/2016 | Paydar et al. | |
| 9,357,846 B2 | 6/2016 | Hung | |
| 9,427,364 B2 | 8/2016 | Grant et al. | |
| 9,706,843 B2 * | 7/2017 | Hung | F16M 11/24 |
| 10,309,578 B2 * | 6/2019 | Yen | F16M 13/022 |
| 10,400,946 B2 | 9/2019 | Bennett et al. | |
| 10,753,529 B2 * | 8/2020 | Hung | F16M 11/105 |
| 10,845,000 B2 * | 11/2020 | Lau | F16M 11/2092 |
| 10,948,946 B2 * | 3/2021 | Borloz | F16M 11/046 |
| 11,054,062 B2 * | 7/2021 | Hung | F16M 11/2014 |
| 2001/0023914 A1 | 9/2001 | Oddsen | |
| 2002/0166353 A1 | 11/2002 | Vickers | |
| 2003/0132356 A1 | 7/2003 | Copeland | |
| 2004/0084587 A1 | 5/2004 | Oddsen | |
| 2004/0256526 A1 | 12/2004 | Burns | |
| 2004/0262475 A1 | 12/2004 | Oddsen | |
| 2005/0284997 A1 | 12/2005 | Tisbo et al. | |
| 2006/0065795 A1 | 3/2006 | Blackburn | |
| 2006/0236732 A1 | 10/2006 | Hoffman | |
| 2006/0261228 A1 | 11/2006 | Hung | |
| 2006/0266909 A1 | 11/2006 | Oddsen | |
| 2006/0273231 A1 | 12/2006 | Huang | |
| 2007/0001076 A1 | 1/2007 | Asamarai et al. | |
| 2007/0023598 A1 | 2/2007 | Kim et al. | |
| 2007/0053151 A1 | 3/2007 | Capoferri et al. | |
| 2007/0080266 A1 | 4/2007 | Oddsen | |
| 2007/0114342 A1 | 5/2007 | Lee | |
| 2007/0153459 A1 | 7/2007 | Wohlford et al. | |
| 2007/0170321 A1 | 7/2007 | Smed | |
| 2007/0187562 A1 | 8/2007 | Gaida et al. | |
| 2007/0222776 A1 | 9/2007 | Choi et al. | |
| 2007/0252056 A1 | 11/2007 | Novin | |
| 2007/0258200 A1 | 11/2007 | Choi et al. | |
| 2007/0278361 A1 | 12/2007 | May et al. | |

(56) References Cited

U.S. PATENT DOCUMENTS

| | | |
|---|---|---|
| 2008/0001048 A1 | 1/2008 | Woo et al. |
| 2008/0006748 A1 | 1/2008 | Watanabe et al. |
| 2008/0006751 A1 | 1/2008 | Chen et al. |
| 2008/0016650 A1 | 1/2008 | Moon et al. |
| 2008/0019393 A1 | 1/2008 | Yamaki |
| 2008/0029661 A1 | 2/2008 | Chen |
| 2008/0029670 A1 | 2/2008 | Hung |
| 2008/0078906 A1 | 4/2008 | Hung |
| 2008/0117578 A1 | 5/2008 | Moscovitch |
| 2008/0132786 A1 | 6/2008 | Asai et al. |
| 2008/0135707 A1 | 6/2008 | Derry et al. |
| 2008/0164395 A1 | 7/2008 | Chang et al. |
| 2008/0192418 A1 | 8/2008 | Zambelli et al. |
| 2008/0234577 A1 | 9/2008 | Murkowski et al. |
| 2008/0237439 A1 | 10/2008 | Oddsen |
| 2008/0283691 A1 | 11/2008 | Bliven et al. |
| 2008/0296452 A1 | 12/2008 | Kim |
| 2008/0308699 A1 | 12/2008 | Kim et al. |
| 2009/0057514 A1 | 3/2009 | Oh |
| 2009/0072108 A1 | 3/2009 | Oleson |
| 2009/0078841 A1 | 3/2009 | Oddsen |
| 2009/0236484 A1 | 9/2009 | Koch et al. |
| 2010/0006727 A1 | 1/2010 | Boomgaarden et al. |
| 2010/0172072 A1 | 7/2010 | Monaco |
| 2010/0239073 A1 | 9/2010 | Eaves |
| 2010/0258694 A1 | 10/2010 | Steger |
| 2011/0006175 A1 | 1/2011 | Gwag |
| 2011/0019344 A1 | 1/2011 | Russell et al. |
| 2011/0108698 A1 | 5/2011 | Chen |
| 2011/0147546 A1 | 6/2011 | Monslave et al. |
| 2011/0260017 A1 | 10/2011 | Monsalve et al. |
| 2011/0278424 A1 | 11/2011 | Theis et al. |
| 2011/0315843 A1 | 12/2011 | Hung |
| 2012/0006767 A1 | 1/2012 | Bennett et al. |
| 2012/0025037 A1 | 2/2012 | Chang |
| 2012/0175476 A1 | 7/2012 | Lau et al. |
| 2012/0182709 A1 | 7/2012 | Asai et al. |
| 2013/0119219 A1 | 5/2013 | Mifsud et al. |
| 2013/0314890 A1 | 11/2013 | Smith |
| 2014/0138506 A1 | 5/2014 | Dahl et al. |
| 2015/0245708 A1 | 9/2015 | Abernethy et al. |
| 2015/0250315 A1 | 9/2015 | Gross et al. |
| 2015/0308610 A1 | 10/2015 | Zhao et al. |
| 2016/0116109 A1 | 4/2016 | Borloz et al. |
| 2018/0148958 A1 | 5/2018 | Liu et al. |
| 2019/0063112 A1 | 2/2019 | Carabalona |

FOREIGN PATENT DOCUMENTS

| | | |
|---|---|---|
| CN | 101427299 A | 5/2009 |
| CN | 201753728 U | 3/2011 |
| CN | 103097978 A | 5/2013 |
| CN | 103671473 A | 3/2014 |
| DE | 4442642 A1 | 6/1996 |
| EP | 1586803 A2 | 10/2005 |
| GB | 2500979 A | 10/2013 |
| JP | 0515529 A | 1/1993 |
| JP | 10126068 A | 5/1998 |
| JP | 2000095034 A | 4/2000 |
| JP | 2001020939 A | 1/2001 |
| JP | 2901142407 A | 5/2001 |
| JP | 2001218133 A | 8/2001 |
| JP | 2002300496 A | 10/2002 |
| JP | 2004019916 A | 1/2004 |
| JP | 2004363788 A | 12/2004 |
| JP | 2005264970 A | 9/2005 |
| JP | 2007520304 A | 7/2007 |
| JP | 2008014472 A | 1/2008 |
| JP | 2008142331 A | 6/2008 |
| JP | 2009533703 A | 9/2009 |
| KR | 20050058738 A | 6/2005 |
| KR | 100825931 B1 | 4/2008 |
| KR | 20100007683 A | 1/2010 |
| WO | 9733057 A1 | 9/1997 |
| WO | 2005074806 A1 | 8/2005 |

OTHER PUBLICATIONS

Non Final Office Action for U.S. Appl. No. 16/344,877, dated Mar. 23, 2021, 11 pages.
Japanese Notice of Reasons for Rejection for Japanese Application No. 2018-546876, dated Mar. 2, 2021 with translation, 7 pages.
Indian Examination Report for Indian Application No. 201917016534, dated Mar. 24, 2021 with translation, 7 pages.
European Communication pursuant to Article 94(3) for European Application No. 17794826.2, dated Mar. 11, 2021, pages.
Partial European Search Report for European Application No. 21 164 667.4, dated Jun. 11, 2021, 11 pages.
Chinese Office Action for Chinese Application No. 201610092558.6 dated Jun. 1, 2017—5 pages.
Drawings of the AV Series Dynamic Mounting Arm made by Southco, Inc., Oct. 7, 2009—12 pages.
First Chinese Office Action for Chinese Application No. 201180033819.2 dated Jul. 14, 2015—27 pages.
Illustration of drafting tables with parallel mechanisms, Wikipedia, Jun. 29, 2010—2 pages.
Illustration of the Ergotron 200 Series Monitor Arm, obtained from the Ergotron website, Jun. 29, 2010—1 page.
Illustration of the GCX-VHM Monitor Support Arm with 16in./40.6cm extension for flat panel displays, obtained from the GCX website, Jun. 29, 2010—1 page.
Illustration of the Hergo Wall Mount Secured Angle (15-000036-L12) Monitor Support Arm, obtained from the Hergo website, Jun. 29, 2010—1 page.
Illustration of the HumanScale Monitor Arm (M4V), obtained from the HumanScale website, Jun. 29, 2010—1 page.
International Preliminary Report on Patentability for International Application No. PCT/US2011/043458, dated Jan. 8, 2013—4 pages.
International Search Report and Written Opinion for International Application No. PCT/US2011/043458, dated Feb. 9, 2012—6 pages.
International Search Report and Written Opinion for International Application No. PCT/US2017/021144, dated Aug. 3, 2017—14 pages.
IPF-2 Monitor Arm, Specification, Olympus, Sep. 2009—12 pages.
Notice of Reasons for Rejection for Japanese Application No. 2016-077539, dated Apr. 25, 2017—12 pages.
Notice of Reasons for Rejection for Japanese Application No. 2016-077539, dated Feb. 6, 2018—8 pages.
Omnimount Product Brochure, part #63HDARM-UA, part #54DARMUA, part #63HDARM, part #63HDARMUA, 2005, obtained from www.omnimount.com on or prior to Mar. 13, 2006—3 pages.
Peerless Product Brochure, models PLA and PLA 2S, 2003, obtained from www.peerlessindustries.com on or prior to Mar. 13, 2006—2 pages.
Sanus Systems product assembly instructions, Vision Mount VMAA Flat Panel Wall Mount, obtained from www.sanus.com on or prior to Mar. 13, 2006—8 pages.
Sanus Systems product assembly instructions, Vision Mount VMDD 26 Flat Panel Wall Mount, obtained from www.sanus.com on or prior to Mar. 13, 2006—8 pages.
Second Chinese Office Action for chinese Application No. 201610092558.6, dated Feb. 2, 2018—7 pages.
Notification of Reason for Refusal for Korean Application No. 10-2018-7028934, dated Apr. 16, 2021, with translation, 20 pages.
Chinese Office Action for Chinese Application No. 2017800159861, dated Dec. 18, 2019 wtih translation, 15 pages.

\* cited by examiner

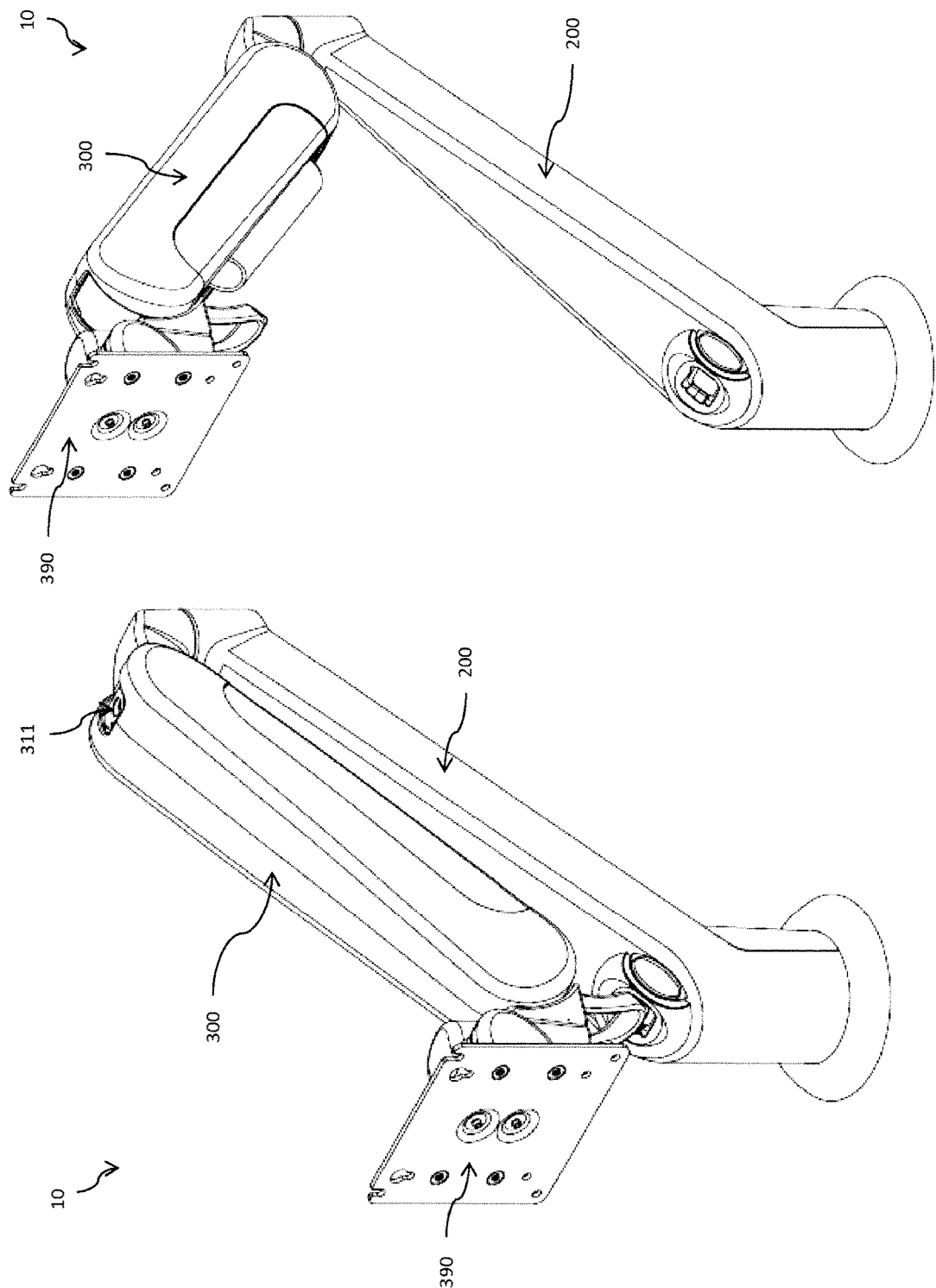

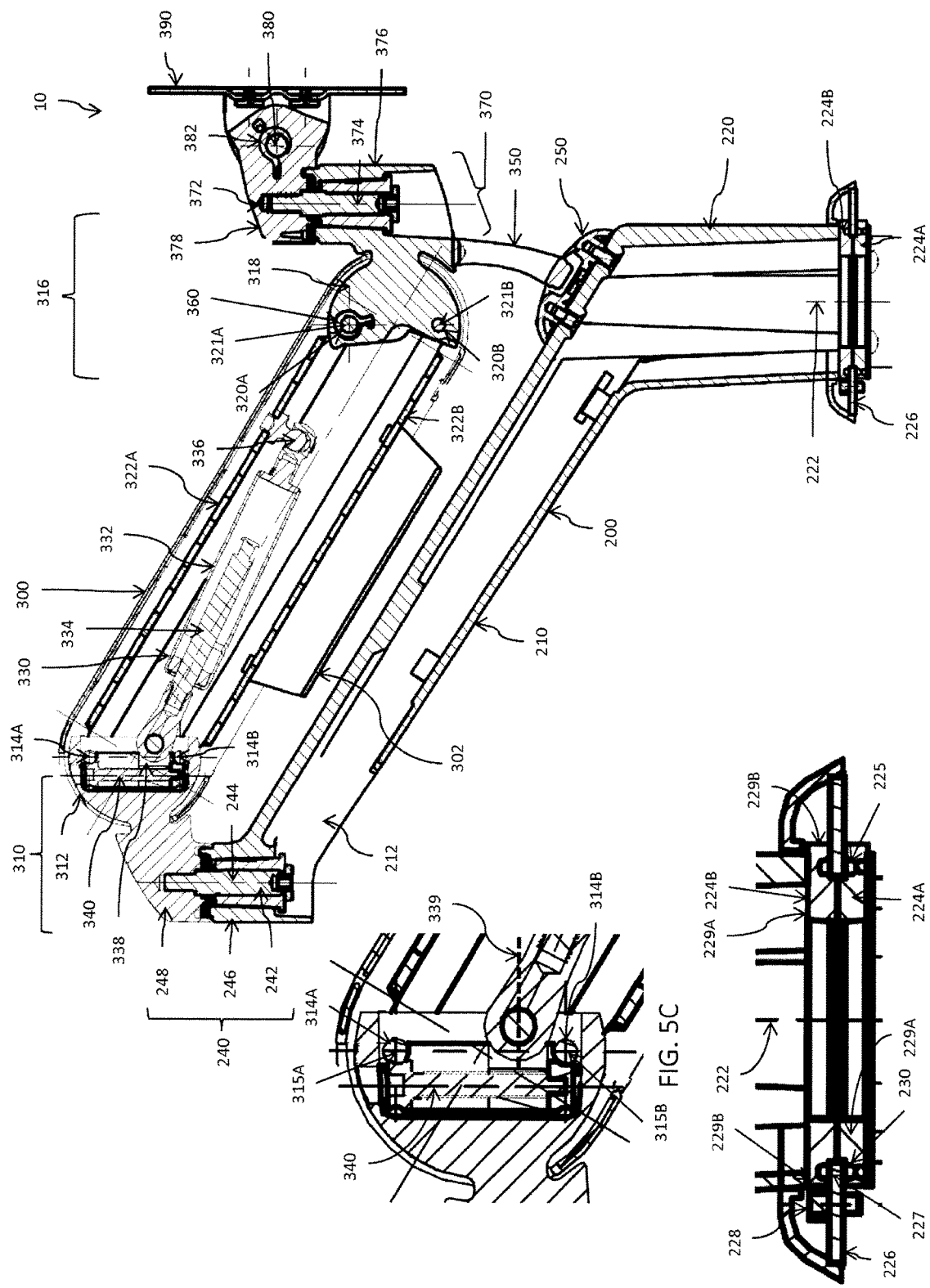

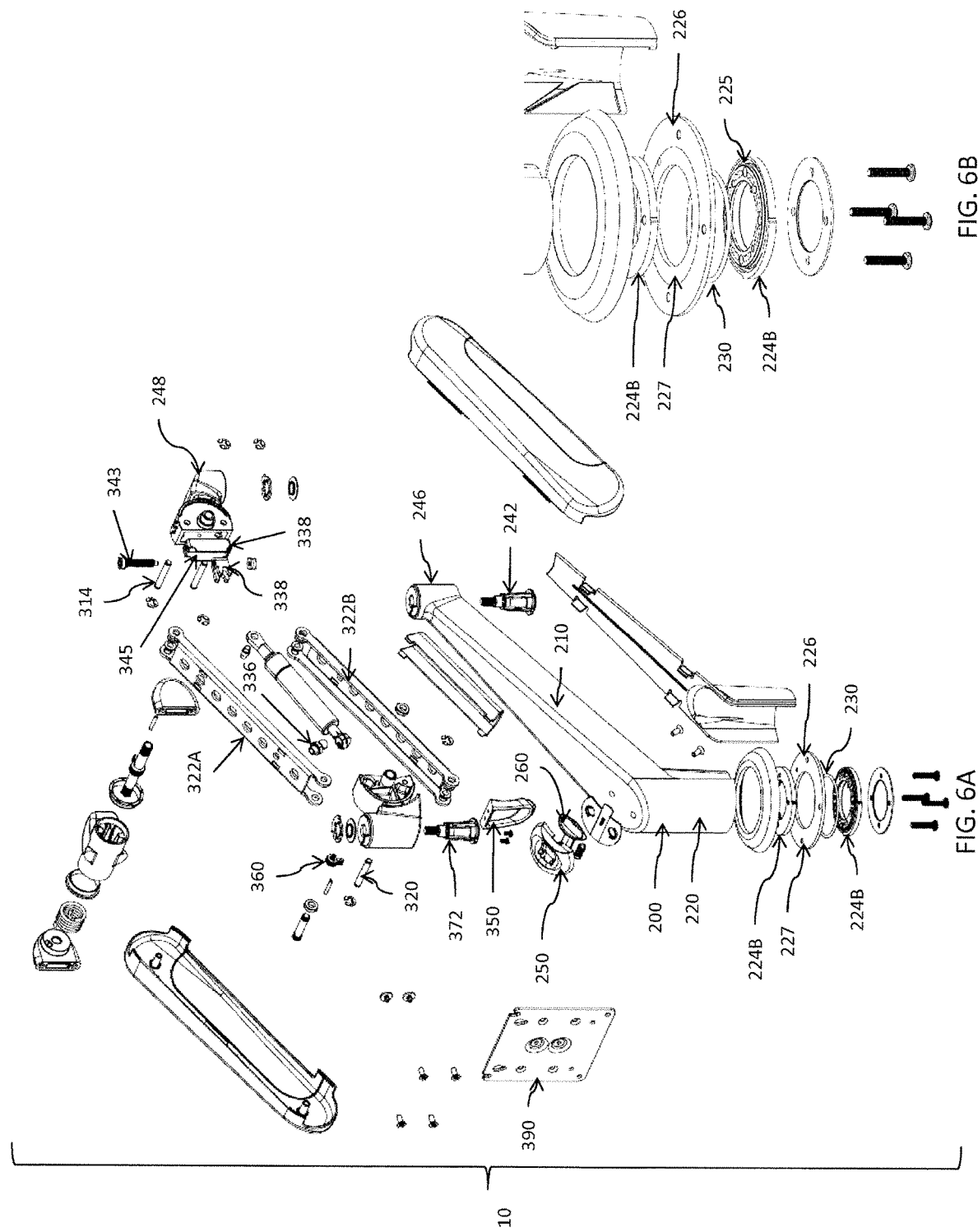

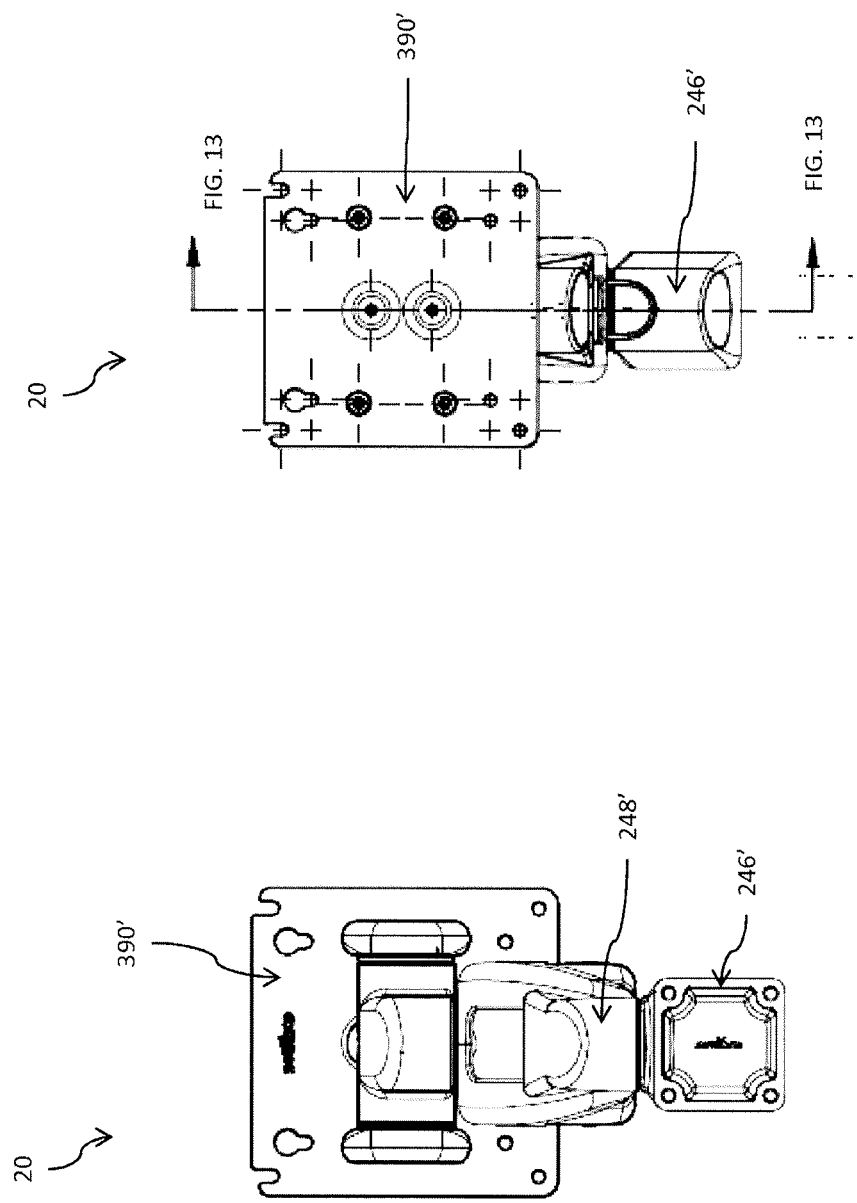

DISPLAY SUPPORT ARM ASSEMBLY FOR MOUNTING A DISPLAY

CROSS-REFERENCE TO RELATED APPLICATION

This application is the U.S. National Phase Application of PCT Application No. PCT/US2017/021144, filed Mar. 7, 2017, which is related to, and claims the benefit of, U.S. Provisional Application No. 62/304,617, entitled A DISPLAY SUPPORT ARM ASSEMBLY FOR MOUNTING A DISPLAY, filed on Mar. 7, 2016, the contents of which are incorporated herein by reference in their entirety for all purposes.

FIELD OF THE INVENTION

The present invention is directed to display support arm assemblies for mounting an object, for example, a flat screen monitor or the like, in a desired position for easy viewing by a user.

BACKGROUND OF THE INVENTION

Display supporting apparatuses for supporting flat screen or flat panel displays have been disclosed in the prior art. For example, a display support arm assembly is disclosed in U.S. Patent Publication No 2012/0006767, which is incorporated herein by reference in its entirety for all purposes. However, there remains a need for improved display support arm assemblies such as display supporting apparatuses offering the advantages of the present invention, which will become apparent from the description of the invention provided herein and the appended drawings.

SUMMARY OF THE INVENTION

Aspects of the present invention are directed to display support arm assemblies for mounting a display.

According to one aspect of the invention, a display support arm assembly includes a proximal housing supporting at least one proximal shaft, a distal housing spaced from the proximal housing and supporting at least one distal shaft, and at least one link extending from the at least one proximal shaft to the at least one distal shaft. The at least one link is coupled for pivotal movement about an axis of the at least one proximal shaft. The display support assembly also includes a gas strut extending between the proximal housing and the distal housing. The gas strut provides a force throughout a range of the vertical adjustment of the display support arm. The display support assembly further includes at least one torque element associated with either or both of the at least one proximal shaft and the at least one distal shaft. The at least one torque element providing force throughout the range of the vertical adjustment of the display support arm, wherein the force is adjustable by adding or subtracting the number of the at least one torque element.

According to another aspect of the invention, a display support arm assembly includes a proximal housing supporting at least one proximal shaft, a distal housing spaced from the proximal housing, and at least one link extending from the proximal housing. The at least one link is coupled for pivotal movement relative to the proximal housing. The at least one link having a stud. The display support assembly also includes a gas strut extending between the proximal housing and the distal housing. The gas strut is coupled at a distal end to the stud and coupled at a proximal end to an adaptor. The gas strut provides a force throughout a range of the vertical adjustment of the display support arm. Rotation of a rod coupled to the adaptor adjusts the force provided by the gas strut by vertically adjusting the adaptor.

According to a further aspect of the invention, a display support assembly includes a display mounting plate and an arm coupled to the display mounting plate. The arm having a mounting portion and a body portion. The mounting portion adapted for attachment to an object and having a first washer and a second washer. The first washer configured to be affixed to an object. The second washer affixed to the mounting portion of the arm. At least one of the first washer and the second washer defines a groove and at least one gasket disposed between the first washer and the second washer and at least partly within the groove. The first washer adapted to rotate with respect to the second washer. The gasket(s), the first washer, and the second washer are configured to resist unintended rotational movement of the arm relative to the object.

According to yet a further aspect of the invention, a display support assembly includes an upper support arm. The upper support arm having a proximal housing, a distal housing spaced from the proximal housing and configured to support a gas strut extending between the proximal housing and the distal housing. The gas strut providing a force throughout a range of the vertical adjustment of the upper display support arm. The upper support arm includes a cable management extension extending from the proximal housing. The cable management extension has a loop portion, positioned to retain a cable, and a keeper. The display support assembly further includes a lower support arm. The lower support arm having a securing mechanism configured to engage the keeper of the cable management extension of the upper support arm, an actuator configured to disengage the keeper from the securing mechanism.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIGS. 1A and 1B are perspective views of an embodiment of a display support arm assembly according to aspects of the invention;

FIG. 5A is a cross-sectional view of the display support arm assembly of FIG. 1A;

FIG. 5B is an enlarged view of a section of the mounting portion of the display support arm assembly of FIG. 5A;

FIG. 5C is an enlarged view of a section of the upper support arm of display support assembly of FIG. 5A;

FIG. 6A is an exploded view of the display support arm assembly of FIG. 1A;

FIG. 6B is an enlarged view of a section of the mounting portion of the display support arm assembly of FIG. 6A;

FIGS. 12A and 12B are a rear view and a front view of the display support arm assembly of FIG. 9;

DETAILED DESCRIPTION OF EMBODIMENTS OF THE INVENTION

Figures 2A, 2B:
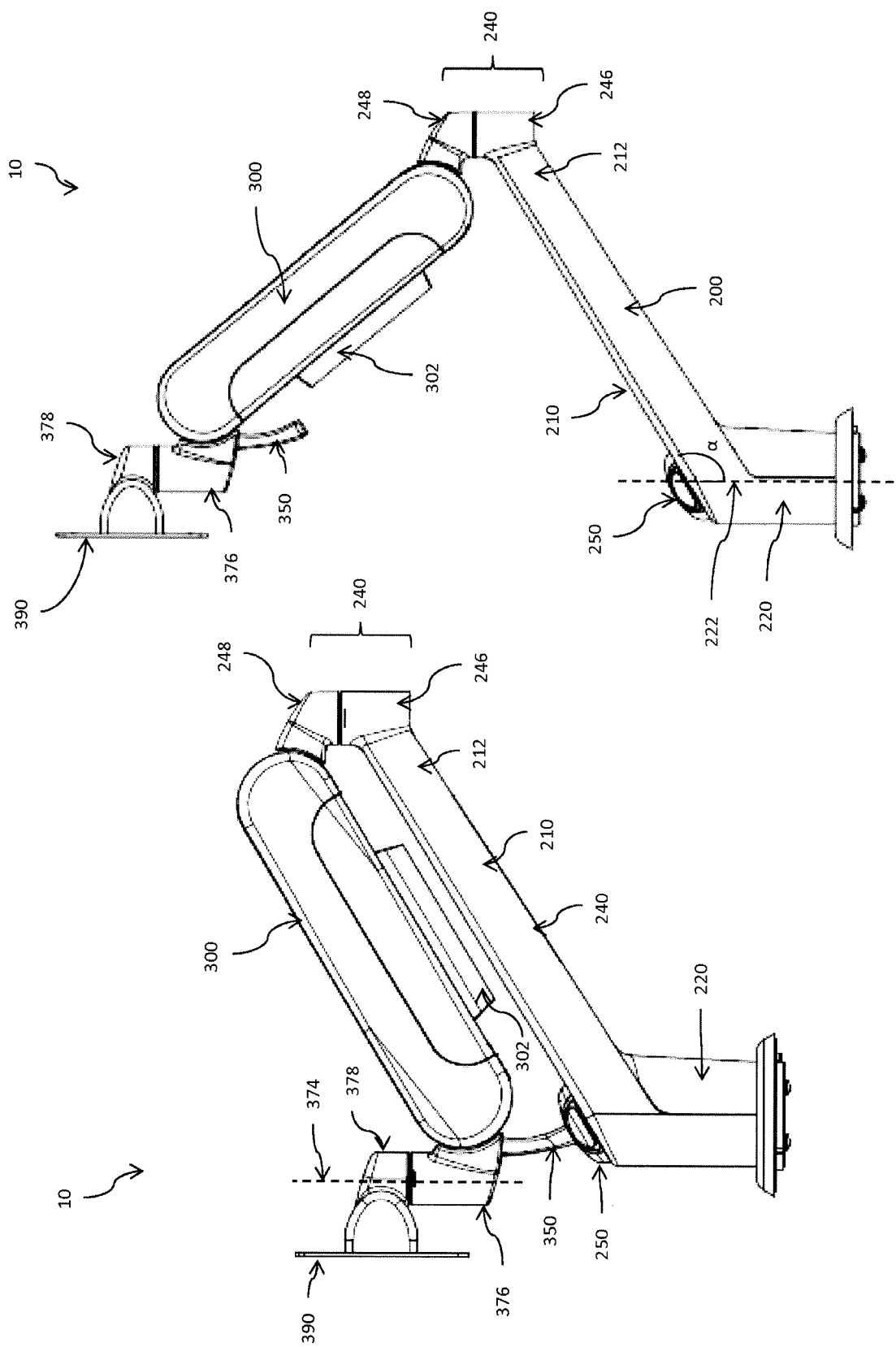
FIGS. 2A and 2B are side views of the display support arm assembly of FIG. 1A.
Figure 3B:
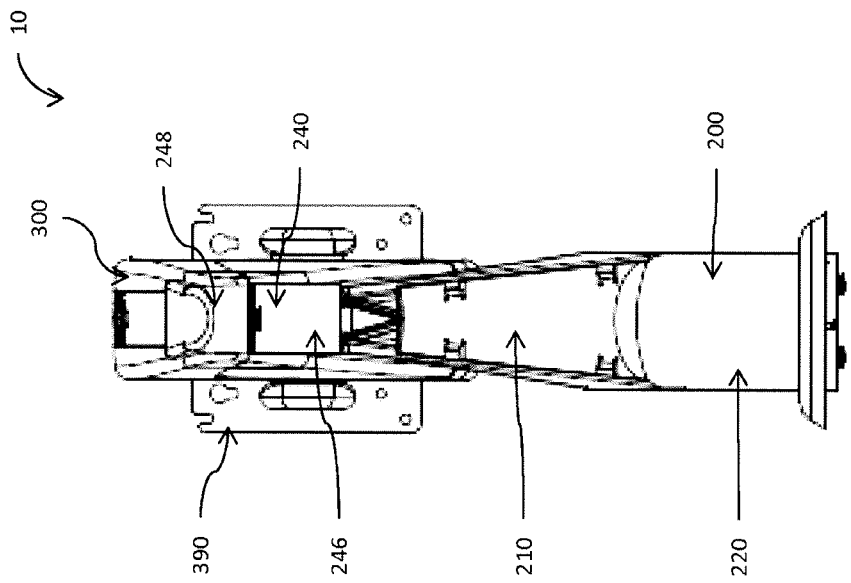
FIGS. 3A and 3B are a front view and rear view, respectively, of the display support arm assembly of FIG. 1A.
Figure 3A:
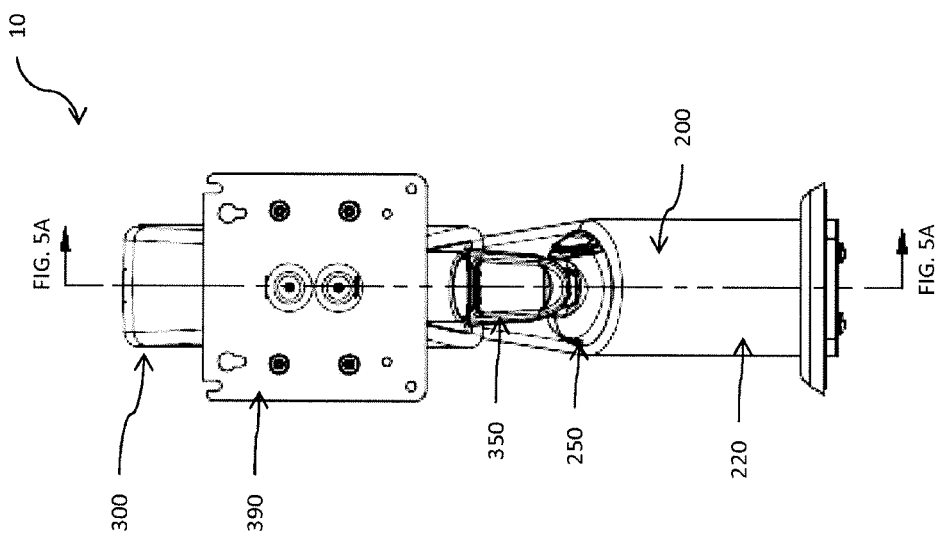
Figure 4B:
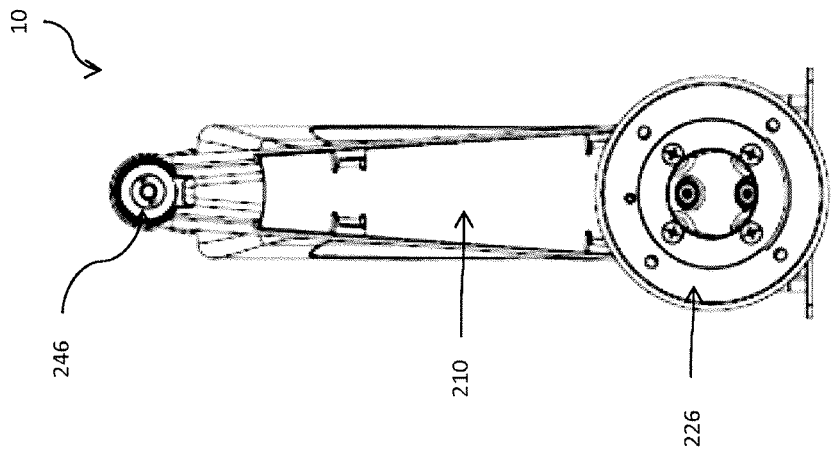
FIGS. 4A and 4B are a top view and a bottom view, respectively, of the display support arm assembly of FIG. 1A.
Figure 4A:
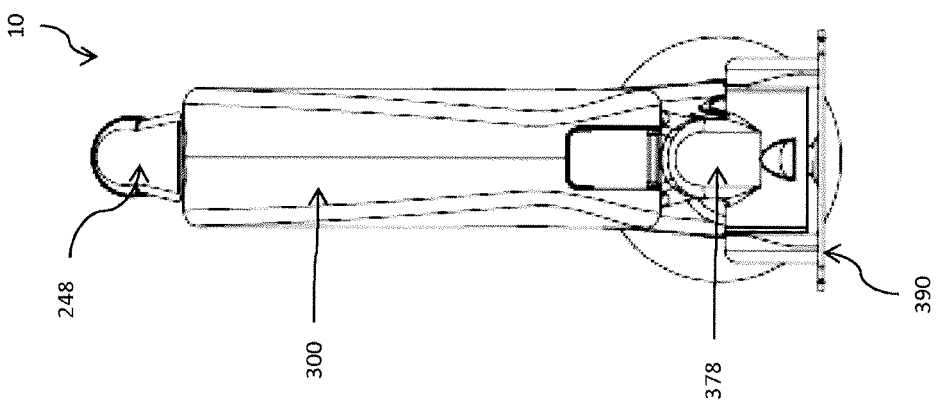

Aspects of the present invention are directed to display support arm assemblies for mounting a display. The display support arm assemblies may be employed to facilitate a user's ability to rotate, move, or otherwise alter the position of the mounted display to suit the user's desire. It is contemplated that the display support arm assemblies may support objects other than displays, such as medical devices, control devices, input devices, monitors, or any other object.

FIGS. 1A-8B illustrate an embodiment of a display arm assembly (namely, an arm assembly 10) for mounting a display. As a general overview, arm assembly 10 includes a lower support arm 200 and an upper support arm 300 coupled to a mounting plate 390.

Lower support arm 200 includes a mounting portion 220 having an axis 222 and an appendage portion 210 extending from mounting portion 220. As illustrated in FIGS. 2A and 2B, appendage portion 210 extends from mounting portion 220 at an angle α with respect to axis 222 of mounting portion 220. For example, appendage portion 210 may extend from mounting portion 220 at an angle α of between 0° and 180° with respect to axis 222 of mounting portion 220.

Mounting portion 220 is configured to be affixed to an object, e.g., a medical device cart, a wall, a wheel chair, a stroller, etc. Mounting portion 220 includes at least one washer and at least one gasket. Referring to FIGS. 5A and 5B, mounting portion 220 has a mounting washer 226 and a clamping washer 224. Mounting wash 226 is adapted for attachment to an object, e.g., by way of screw 228. Although mounting portion 220 is attached to an object by way of screw 228 passing though mounting washer 226 as seen in FIG. 5B, mounting portion 220 may be coupled to an object by any suitable means including mechanical means, such as riveting, crimping, welding, or the like and/or non-mechanical means, such as adhesives.

Clamping washer 224 is affixed to the mounting portion 220 of lower support arm 200. Clamping washer 224 is rotatably coupled to mounting washer 226 such that clamping washer 224 may rotate with respect to mounting washer 226 around axis 222, thereby enabling lower support arm 200 to rotate around axis 222 with respect to the object that mounting washer 226 is attached to. As illustrated in FIG. 5B, clamping washer 224 is formed of two separate washers 224A and 224B, which may be affixed together to clamp onto an inner end section 227 of mounting washer 226. In one embodiment, clamping washer 224 (e.g., either or both of clamping washer 224A and clamping washer 224B) has a diameter that is dissimilar to mounting washer 226. As illustrated in FIG. 5B, clamping washer 224A has a shoulder portion 229A that contacts a shoulder portion 229A of clamping washer 224B, such that coupling clamping washer 224A and clamping washer 224B secures mounting washer 226 between the non-shoulder portions 229B of clamping washer 224A and 224B. There may be a clearance between the non-shoulder portion 229B of one of the clamping washers 224A or 224B and the mounting washer 226 due to the positioning of the gasket 320. Coupling clamping washer 224A and clamping washer 224B may produce a predetermined amount of compression of gasket 230. In one embodiment, a predetermined amount of friction force is produced upon rotation of mounting portion 220 by the coupling of clamping washer 224A and clamping washer 224B, which produces a predetermined amount of compression of gasket 230 (e.g. an O-ring). In another embodiment, mounting washer 226 is formed from a metal material and clamping washer 224A and/or 224B is formed from a non-metal material such as a polymer material.

Clamping washer 224 defines a groove 225 configured to receive at least one gasket 230, e.g., two or more, three or more, four or more, etc. Upon assembly of mounting portion 220, gasket 230 is disposed at least partly within groove 225 and between clamping washer 224 and mounting washer 226. Gasket 230 may be formed of any suitable material, such as rubber, silicone, plastic, etc. In one embodiment, gasket 230 is an O-ring. Gasket 230 is not limited to any particular shape and may have a geometric shape, such as a square, triangle, rectangle, hexagon, etc., or a non-geometric shape that is adapted for groove 230. By modifying the size, shape, or material of gasket 230, it is possible to increase or decrease the friction between clamping washer 224 and mounting washer 226, thereby increasing or decreasing the amount of force required to rotate lower support arm 200 around axis 222. Additionally and/or alternatively, the depth of groove 225 may be increased or decreased to modify the amount of force and compression on gasket 230, thereby modifying the friction between clamping washer 224 and mounting washer 226. The use of clamping washer 224, mounting washer 226, and gasket 230 advantageously allows a predetermined amount of friction to be obtained by utilizing gaskets having various sizes, shapes, and materials.

Additionally, use of gasket 230 to produce rotational friction between clamping washer 224 and mounting washer 226, provides several advantages over conventional systems. For example, increasing the compression of gasket 230 produces a predictable increase of friction. In one embodiment, the friction produced by gasket 230 increases substantially exponentially with increasing compression of gasket 230 within a specified range of compression forces. Additionally and/or alternatively, long life cycles may be obtained by employing clamping washer 224, mounting washer 226, and gasket 230 disposed therebetween.

Appendage portion 210 of lower support arm 200 extends from mounting portion 220 to a distal end portion 212. Distal end portion 212 is coupled to joint portion 240 to provide a connection between lower support arm 200 and upper support arm 300. For example, as illustrated in FIGS. 1A-4B, distal end portion 212 of appendage portion 210 is attached to joint portion 240, which is attached to distal portion 310 of upper support arm 300.

Joint portion 240 is configured to permit rotation of upper support arm 300 with respect to lower support arm 200. For example, joint portion 240 supports a stud 242 having a longitudinal axis 244. Joint portion 240 includes a lower housing 246 and an upper housing 248. Lower housing 246 and upper housing 248 together define a cavity that houses stud 242. Stud 242 may be secured within the cavity defined by lower housing 246 and upper housing 248 by any suitable means. One of either lower housing 246 or upper housing 248 may rotate with respect to stud 242 around longitudinal axis 244. In one embodiment, both lower housing 246 and upper housing 248 may rotate with respect to stud 242 around longitudinal axis 244. Friction elements may be coupled around stud 242 to provide a friction force to resist rotation of upper support arm 300 with respect to lower support arm 200. A protrusion or the like may be coupled to stud 242 or cavity 345 defined by housing 248 and/or 246 to act as a hard stop, which prevents rotation of upper housing 248 with respect to lower housing 246 beyond a predetermined point.

Upper support arm 300 includes a proximal housing, which supports at least one proximal shaft, and a distal housing, which supports at least one distal shaft. At least one distal housing is spaced from the at least one proximal housing. As illustrated in FIG. 5A, proximal housing 318 supports two proximal shafts 320A and 320B, each having a longitudinal axis 321A and 321B, respectively. Proximal shafts 320A and 320B may be arranged in proximal housing 318 such that longitudinal axis 321A and 321B are parallel and/or reside in the same vertical plane. Distal housing 312 supports two distal shafts 314A and 314B, each having a longitudinal axis 315A and 315B. Similar to proximal shafts 320A and 320B, distal shafts 314A and 314B may be arranged such that longitudinal axis 315A and 315B are parallel and/or reside in the same vertical plane.

Upper support arm 300 also includes at least one link extending from the at least one proximal shaft to the at least one distal shaft. Links 322A and 322B extend from proximal shaft 320A and 320B to distal shaft 314A and 314B, respectively. Links 322 are coupled for pivotal movement about longitudinal axis 321 of proximal shafts 320 and/or distal shafts 314. Although the embodiment in FIG. 5A illustrates two links (e.g., 322A and 322B), two proximal shafts (320A and 320B), and two distal shafts (e.g., 314A and 314B), more than or less than two links 322, two proximal shafts 320, and/or two distal shafts 314 may be employed without deviating from the spirit of the invention. According to one embodiment, longitudinal axis 321A and 321B of shafts 320A and 320B remain in a single vertical plane as proximal portion 316 of upper support arm 300 is raised or lowered with respect to distal portion 310 of upper support arm 300. In another embodiment, upper support arm 300 may be vertically adjusted (e.g., raised or lowered) without altering the orientation of display mount 390 and/or proximal housing 318 with respect to the distal housing 312. Additionally and/or alternatively, link 322A may remain parallel to link 322B as upper support arm 300 is adjusted vertically with respect to lower support arm 200.

Upper support arm 300 also includes a gas strut 330. Gas strut 330 includes a strut housing 332 and a piston 334. In one embodiment, gas strut 330 is a telescoping gas strut adapted to counter balance the weight of the display and/or object mounted to mounting plate 390, such that the vertical position of upper support arm 300 is maintained. Strut housing 332 may contain a pressurized fluid therein, such as a pressurized gas or a pressurized liquid. Piston 334 may have a head portion with an aperture that limits the amount of fluid passing there through from one side of piston 334 to the other side of piston 334 as piston 334 moves within strut housing 332. According to one embodiment, the fluid within strut housing 332 biases piston 334 outwards from strut housing 332 as the presence of piston 334 reduces the area of the head portion which the fluid within strut housing 332 applies pressure.

Gas strut 330 may be configured to provide substantially constant force that provides resistance to movement throughout a range of the vertical adjustment of upper support arm 300. For example, gas strut 330 may be configured to provide a resistive force that varies by 10% or less as upper support arm 300 is raised or lowered vertically with respect to lower support arm 200. Gas strut 330 may also be adapted to dampen vertical movement of upper support arm 300, e.g., to provide the user with better control when adjusting the height of upper support arm 300.

Gas strut 330 extends between proximal housing 318 and distal housing 312. As illustrated in FIG. 5A, gas strut 330 is coupled at a first end to distal housing 312 by way of adaptor 338 and coupled at a second end to a knob 336 attached to link 322A. Adaptor 338 includes an aperture having a threaded inner surface. The threaded inner surface of adaptor 338 is mated with the threads of adjustment rod 340, which is disposed at least partly within the threaded aperture of adaptor 338 such that rotation of adjustment rod 340 vertically raises or lowers adaptor 338 along adjustment rod 340. By vertically raising or lowering adaptor 338 along adjustment rod 340, the amount of substantially constant resistive force provided by gas strut 330 may be increased or decreased. Accordingly to one embodiment, adjustment rod 340 is accessible through an opening 311 in distal housing 312 to permit a user to adjust the resistive force provided by gas strut 330 after assembly of arm assembly 10, e.g., using a hexagon screw bit.

Adjustment rod 340 and adaptor 338 may be coupled to distal housing 312 by way of shell 342. Shell 342 is adapted to reduce and/or prevent noise related to gas strut 330 being compressed, extended, and/or rotating over center axis 339 (e.g., an axis defined by piston 334 of gas strut 330 being parallel with adaptor 338). Shell 342 may be positioned at least partially within cavity 345 defined by an inner surface of distal housing 312. Shell 342 may be positionally secured within cavity 345 by contacting, e.g., 5 or more walls and/or each of the walls of cavity 345. In one embodiment, shell 342 is press fitted within cavity 345 of distal housing 312, thereby securing shell 342 within cavity 345 of distal housing 312. Alternatively, shell 342 may be secured by way of mechanical means, such as fasteners, welding, etc., or non-mechanical means, such as adhesives.

Shell 342 has at least one opening 343 for receiving at least a portion of adjustment rod 340. Opening 343 of shell 342 is preferably aligned with the opening 311 in distal housing 312, such that adjustment rod 340 is accessible through opening 311 and opening 343. Adjustment rod 340 and shell 342 may be configured such that adjustment rod 340 does not contact distal housing 340 upon assembly.

Shell 342 is preferably formed of a material that is dissimilar to the material of distal housing 312. For example, shell 342 may be formed of a material that is more flexible than the material of distal housing 312, such that shell 342 may be securely retained in cavity 345 by press fitting or interference fitting. Distal housing 312 may be formed of a metal material. Shell 342 may be formed of a polymer material or have a polymer outer surface layer. Suitable polymer materials include, but are not limited to, polyethylene terephthalate, high-density polyethylene, polyvinyl chloride, polyamide, polyoxmethylene or the like.

By forming shell 342 from a suitable polymer material, shell 342 may be configured to retain adjustment rod 340 within a specified position in cavity 345 defined by distal housing 312 (e.g., such that opening 343 of shell 342 aligns with the opening 311) with a minimal clearance. As result of the suitable polymer materials, a minimal clearance between shell 342 and cavity 345 defined by distal housing 312 and/or a minimal clearance between adjustment rod 340 and shell 342 can be obtained while not requiring tight/strict manufacturing tolerances. For example, by employing suitable polymer materials having a desirable amount of flexibility, shell 342 may retain adjustment rod 340 and adaptor 338 in a specific position with respect to the distal housing 312 without requiring shell 342 to be precisely manufactured. In other words, shell 342 may be advantageously configured to provide the necessary flexibility to satisfy tight clearances without requiring the manufacturing processes to comply with very tight tolerances.

In one embodiment, shell 342 is configured such that the assembly of distal housing 312 may include: fitting (e.g., loose fitted or press fitted) adjustment rod 340 partially within shell 342; positioning adjustment rod 340 through adaptor 338; fitting (e.g., loose fitted or press fitted) shell 342 within cavity 345 of distal housing 312. In another embodiment, assembly of distal housing 312 may include: fitting (e.g., loose fitted or press fitted) shell 342 within cavity 345 of distal housing 312; fitting (e.g., loose fitted or press fitted) adjustment rod 340 partially within shell 342; positioning adjustment rod 340 through adaptor 338.

Upper support arm 300 has at least one torque element associated with either or both of the at least one proximal shaft 320 and at least one distal shaft 314. As illustrated in FIG. 5A, torque elements 360 are coupled to proximal shaft 320A to provide friction torque to resist vertical adjustment of upper support arm 300. Torque elements 360 may be adapted to provide force throughout the range of vertical adjustment of arm assembly 10, wherein the force is adjustable by adding or subtracting the number of torque elements 360. Coupling torque elements 360 to proximal shaft 320 and/or distal shaft 314 advantageously enables the amount of friction torque to be increased or decreased by adding or subtracting one or more torque elements 360 after arm assembly 10 is substantially assembled. Additionally and/or alternatively, the friction produced by torque element 360 may be increased or decreased by increasing or decreasing, respectively, the size and/or thickness of torque elements 360, or the diametral interference of the torque elements 360 with respect to housing (e.g., housings 312 and/or 318) and/or shaft (e.g., shafts 320 and/or 314). One or more torque elements 360 may be asymmetrical torque elements. According to one embodiment, torque elements 360 provide a greater torque friction to resist rotational movements that would vertically lower proximal portion 316 of upper support arm 300 with respect to distal portion 310 of upper support arm 300.

The amount of friction force applied asymmetrically may be increased and/or decreased by having one or more torque elements 360 disposed to produce an asymmetrically greater friction force that resists movement in a first direction and one or more torque elements disposed to produce an asymmetrically greater friction force that resists movement in a second direction. For example, two or more torque elements 360, producing asymmetrical force may be positioned to produce opposing asymmetrical friction forces that result in the friction force being applied symmetrically to movement in either the first rotational direction or the second rotation direction. This configuration advantageously enables arm assembly 10 to be modified prior to shipping, to produce a friction force that is applied asymmetrically or symmetrically at an amount that satisfies the request of the customer's specifications.

Torque elements 360 advantageously enable sufficient friction to be produced when proximal housing 318 is raised or lowered with respect to distal housing 312, such that gas strut 330 may be configured without friction elements. In one embodiment, operatively coupling torque elements 360 to shafts 320 and/or 314 enables more friction to be produced than conventional configurations employing friction elements around the piston of the gas strut. Because torque elements 360 dampen the bounce sensation produced after a gas strut is rapidly compressed or expanded as a result of the rapid compression or expansion of the gas or fluid in the gas strut, torque elements 360 are capable of dampening the bounce sensation from more power gas struts than conventional configurations. Accordingly, in one embodiment, gas strut 330 comprises housing 332 and piston 334 mounted for movement with respect to housing 332, wherein gas strut 330 is devoid of a friction element for generating friction between piston 334 and housing 332 to resist movement of piston 334 with respect to housing 332.

Conventional gas struts having friction elements around the piston also have a more limited range of extension and retraction per a specified length of gas strut as the friction elements around the piston reduce the amount the piston may be displaced with respect to the gas cylinder of the gas strut. However, because arm assembly 10 employs torque elements 360 around shafts 320 and/or 314, gas strut 330 may advantageously have a greater range of extension and retraction as compared to conventional configurations having friction elements around the piston of the gas strut. Accordingly, arm assembly 10 enables smaller, more power, and cheaper gas struts to be employed. The configurations disclosed herein may also have a longer life cycle than conventional configurations as a result of removing the friction elements from around the piston of the gas strut.

Referring to FIGS. 7A-8B, arm assembly 10 also includes a securing mechanism 250 configured to secure upper support arm 300 with respect to lower support arm 200 by engaging a keeper 352. Although securing mechanism 250 is attached to lower support arm 200 and keeper 352 of cable management extension 350 is attached to upper support arm 300 in FIGS. 1A-8B, in other embodiments securing mechanism 250 is attached to upper support arm 300 and cable management extension 350 is attached to lower support arm 200.

Securing mechanism 250 includes a hook portion 254, a biasing element 256 and a cover 252 defining a space between lower support arm 200 and cover 252. Hook portion 254 and biasing element 256 are disposed within the space defined between lower support arm 200 and cover 252. Cover 252 has a passageway 253 extending there through. Biasing element 256 is adapted to urge hook portion 254 toward an engaging position, in which hook portion 254 is accessible through passageway 253. Hook portion 254 of securing mechanism 250 is configured to engage keeper 352 of cable management extension 350 while in an engaging position.

Figure 7B:
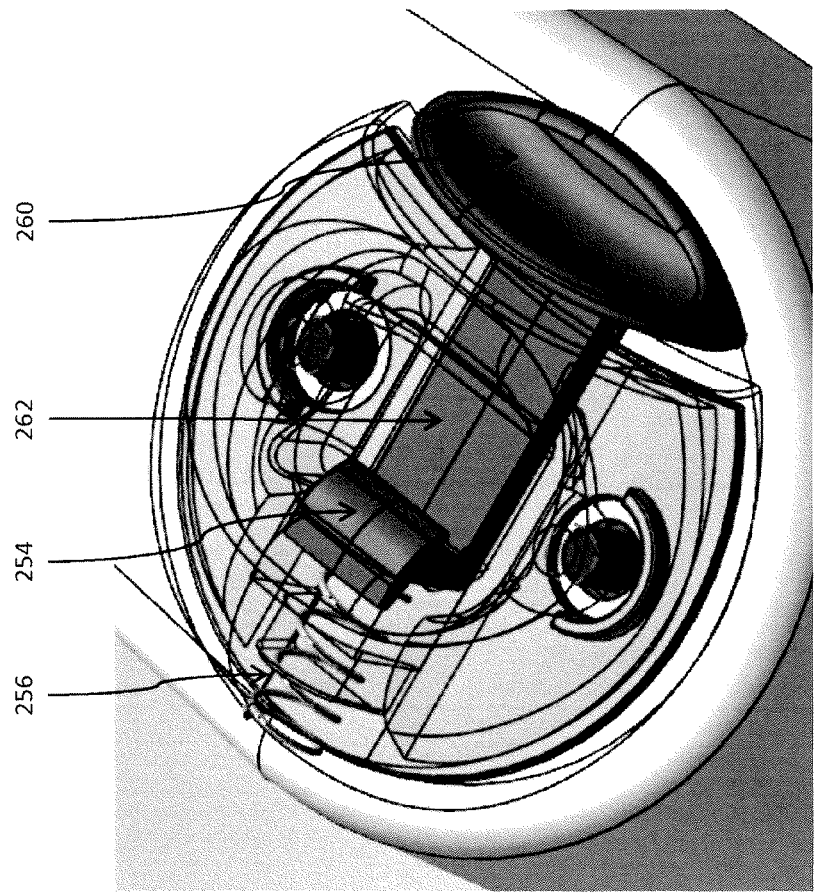
FIG. 7B is an enlarged view of the securing mechanism of FIG. 7A with the cover of the securing mechanism being translucent.
Figure 7A:
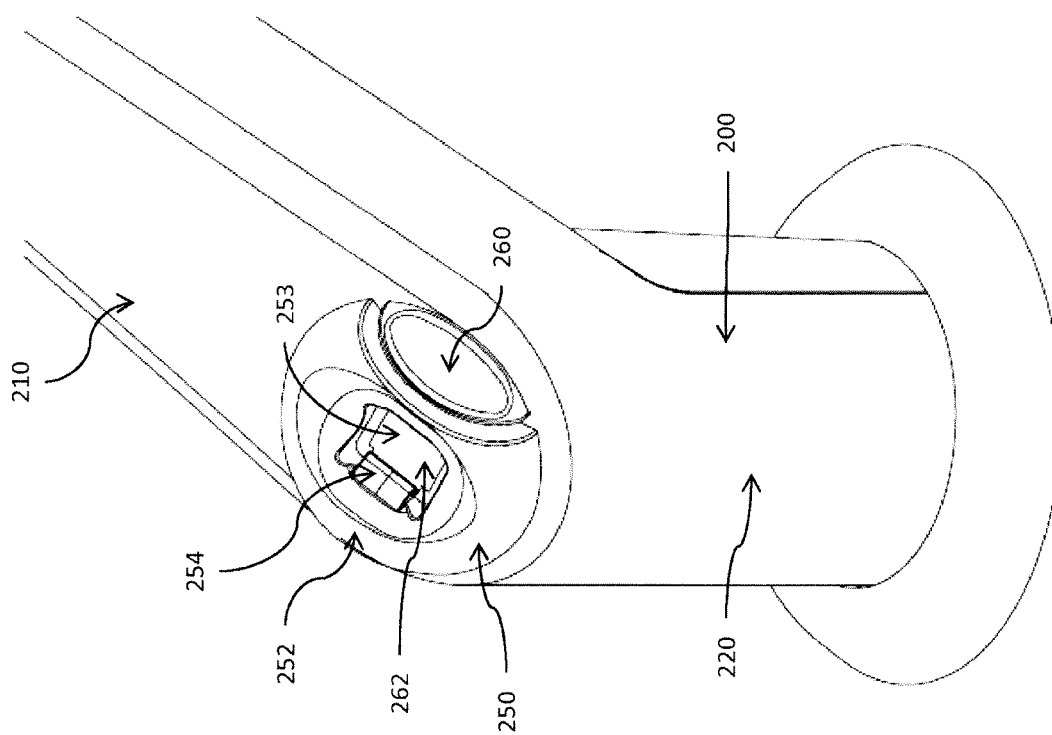
FIG. 7A is an enlarged view of a securing mechanism of the display support arm assembly of FIG. 1A.

Actuator 260 is configured to disengage hook portion 254 of securing mechanism 250 from keeper 352 of cable management extension 350. As illustrated in FIG. 7B, actuator 260 is coupled to hook portion 254 by connector 262. Accordingly, by moving actuator 260 inward to actuate actuator 260, hook portion 254 is also moved inwards, thereby releasing keeper 352 and disengaging cable management extension 350 from securing mechanism 250.

Figure 8B:
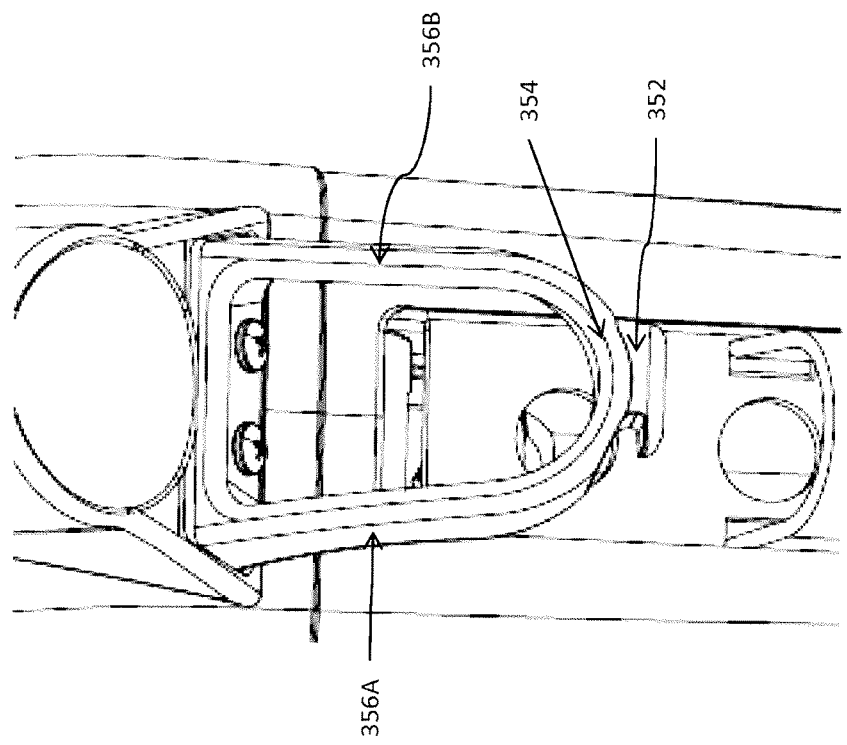
FIGS. 8A and 8B are perspective view of a keeper of the display support arm assembly of FIG. 1A.
Figure 8A:
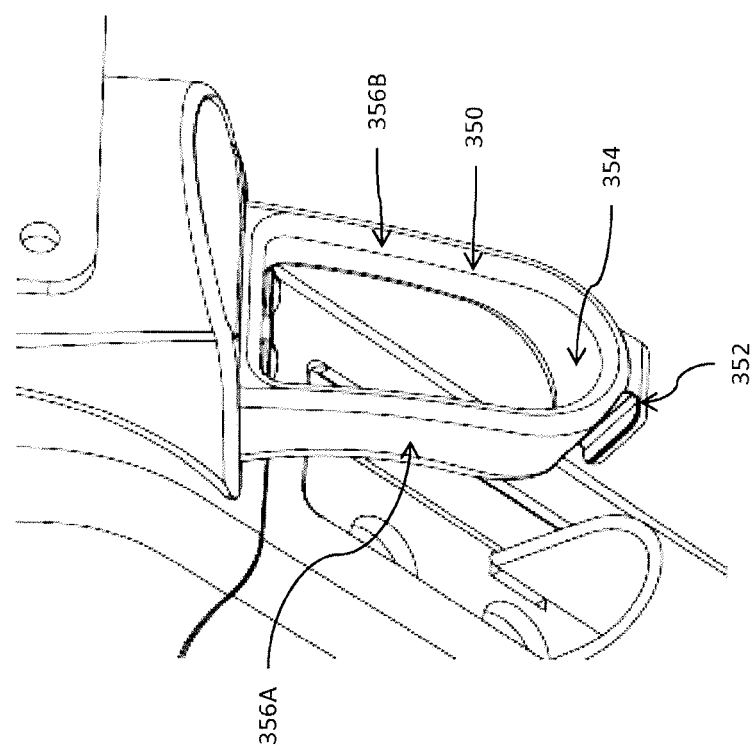
Figure 9:
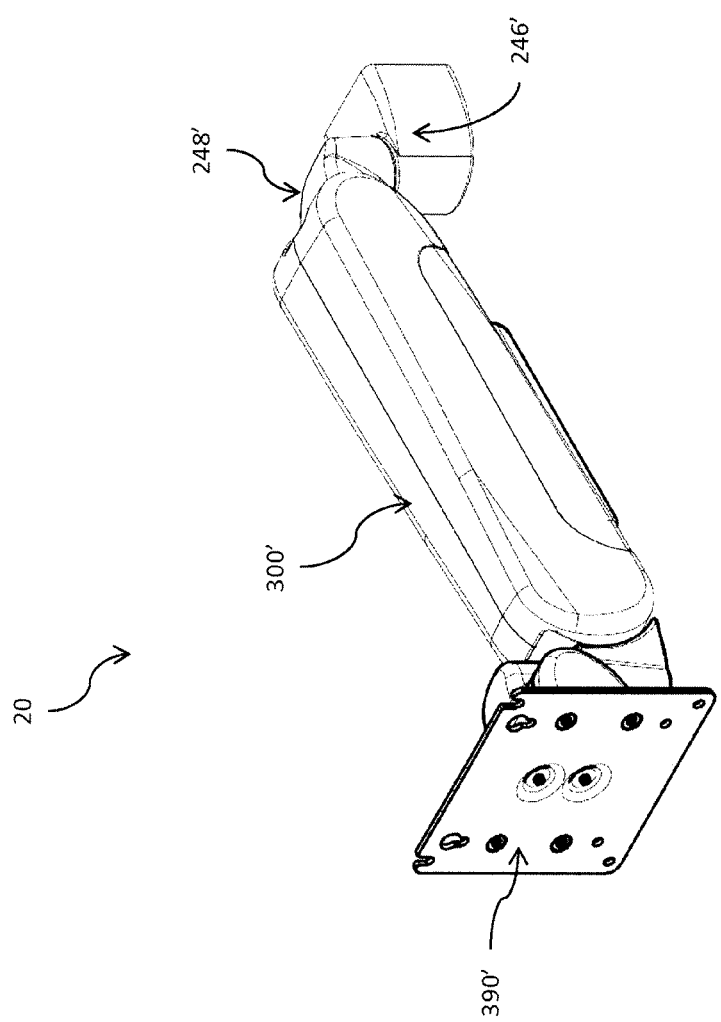
FIG. 9 is a perspective view of another embodiment of an display support arm assembly according to aspects of the invention.
Figures 10A, 10B:
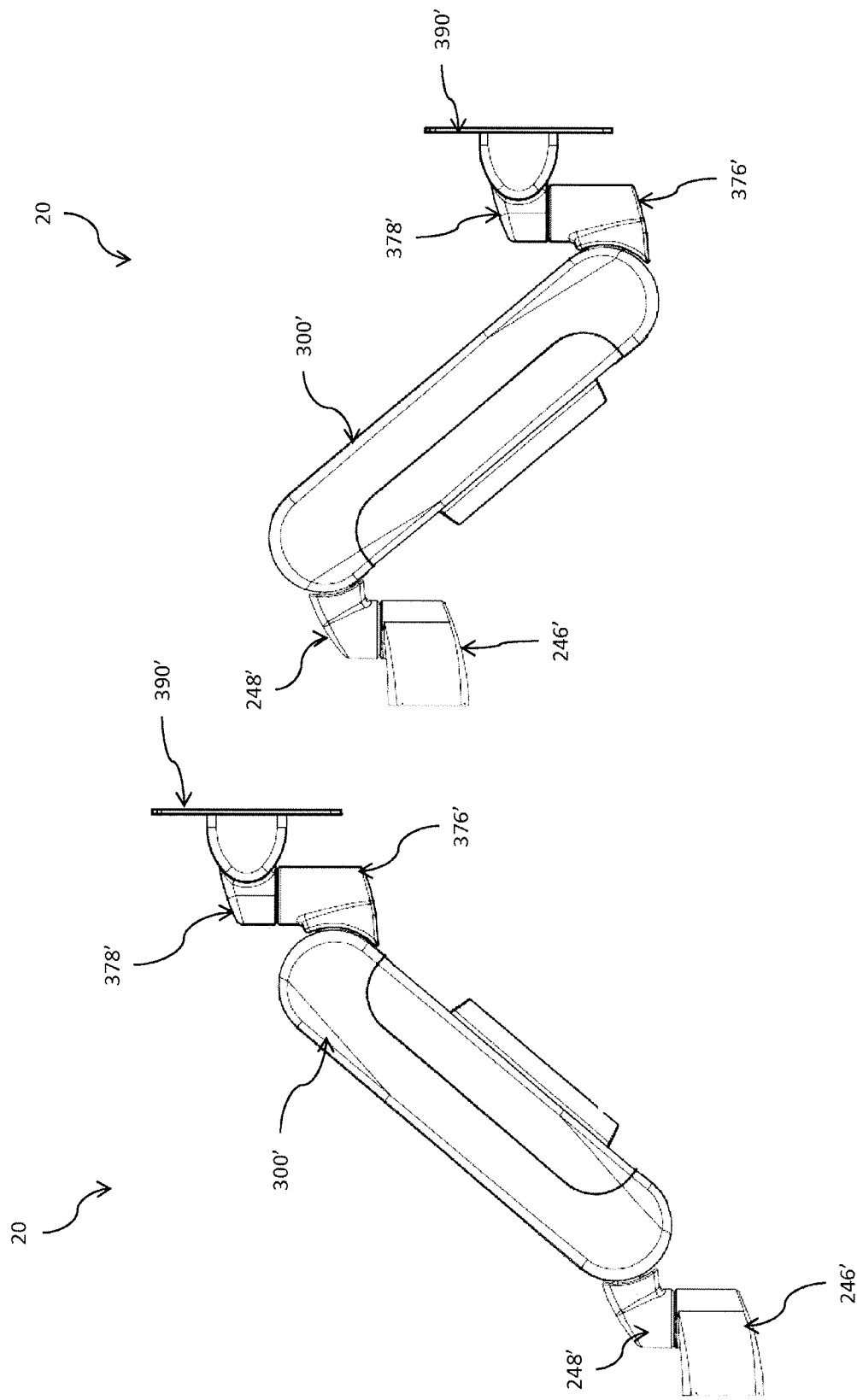
FIGS. 10A and 10B are side views of the display support arm assembly of FIG. 9 in a raised position and a lowered position, respectively.
Figure 11A:
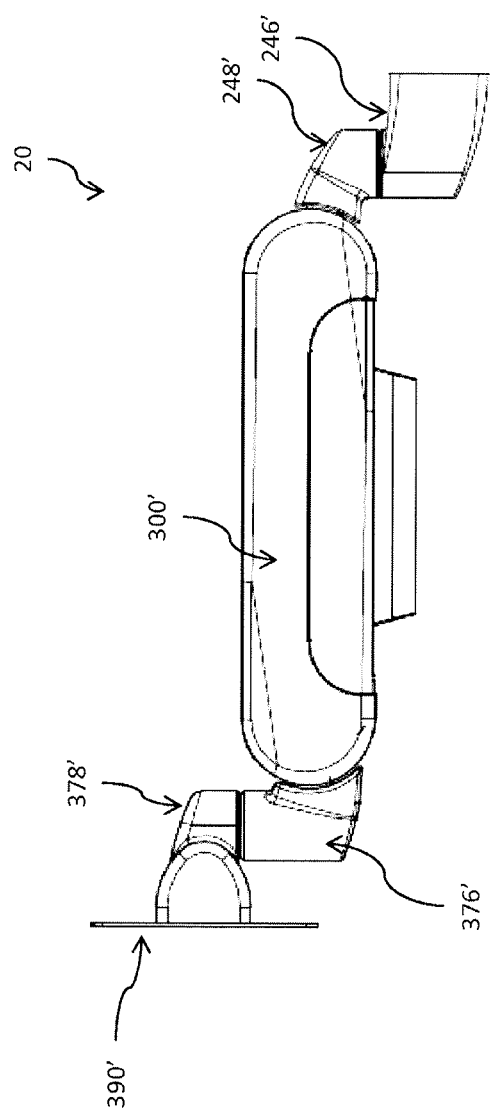
FIGS. 11A and 11B are a side view and a top view of the display support arm assembly of FIG. 9.
Figure 11B:
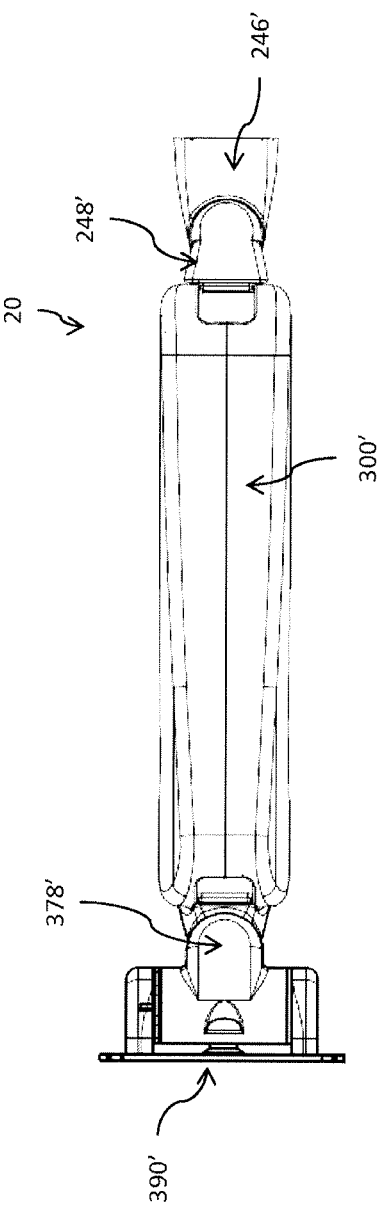
Figure 13:
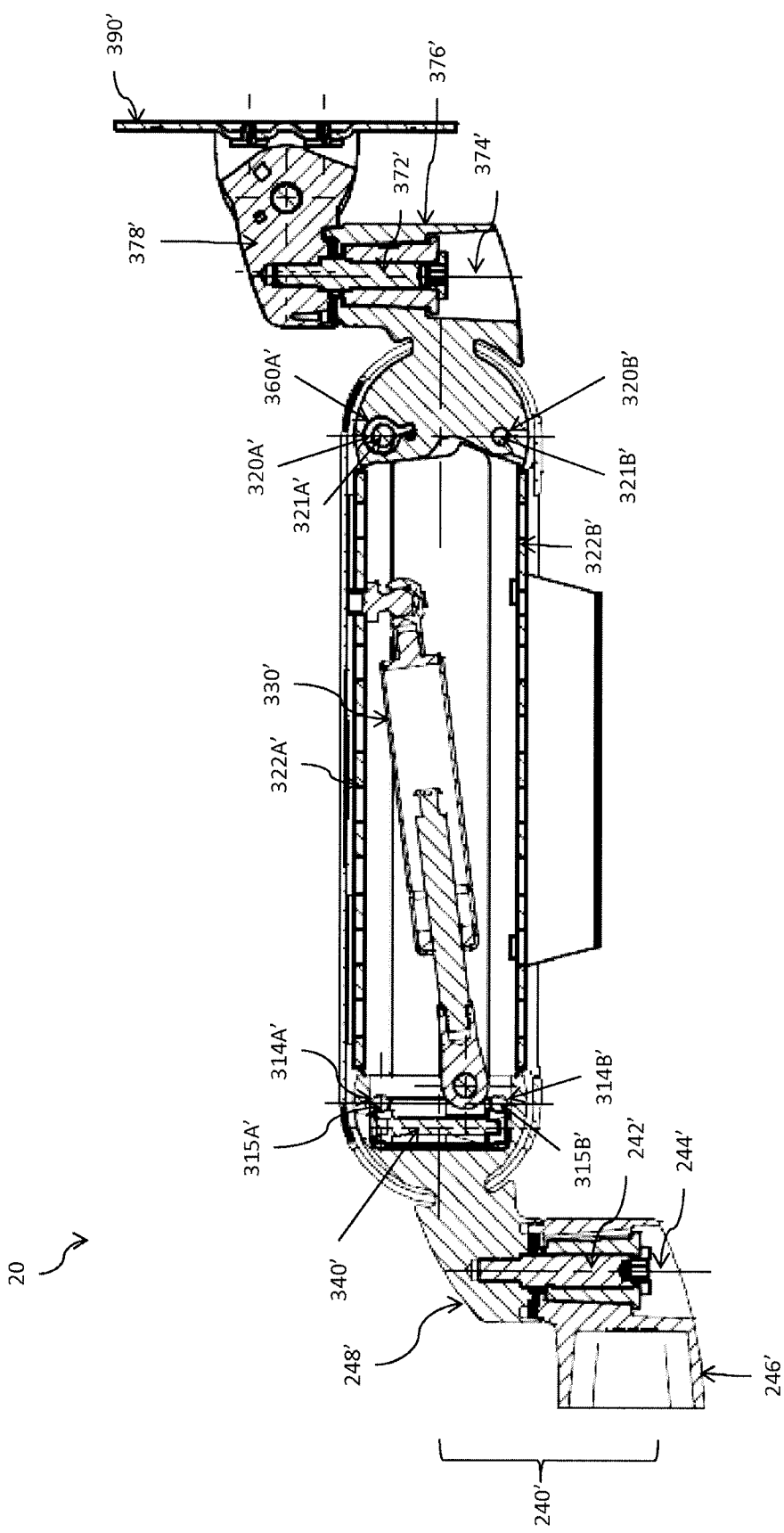
FIG. 13 is a cross-sectional view of the display support arm assembly of FIG. 12B.
Figure 14:
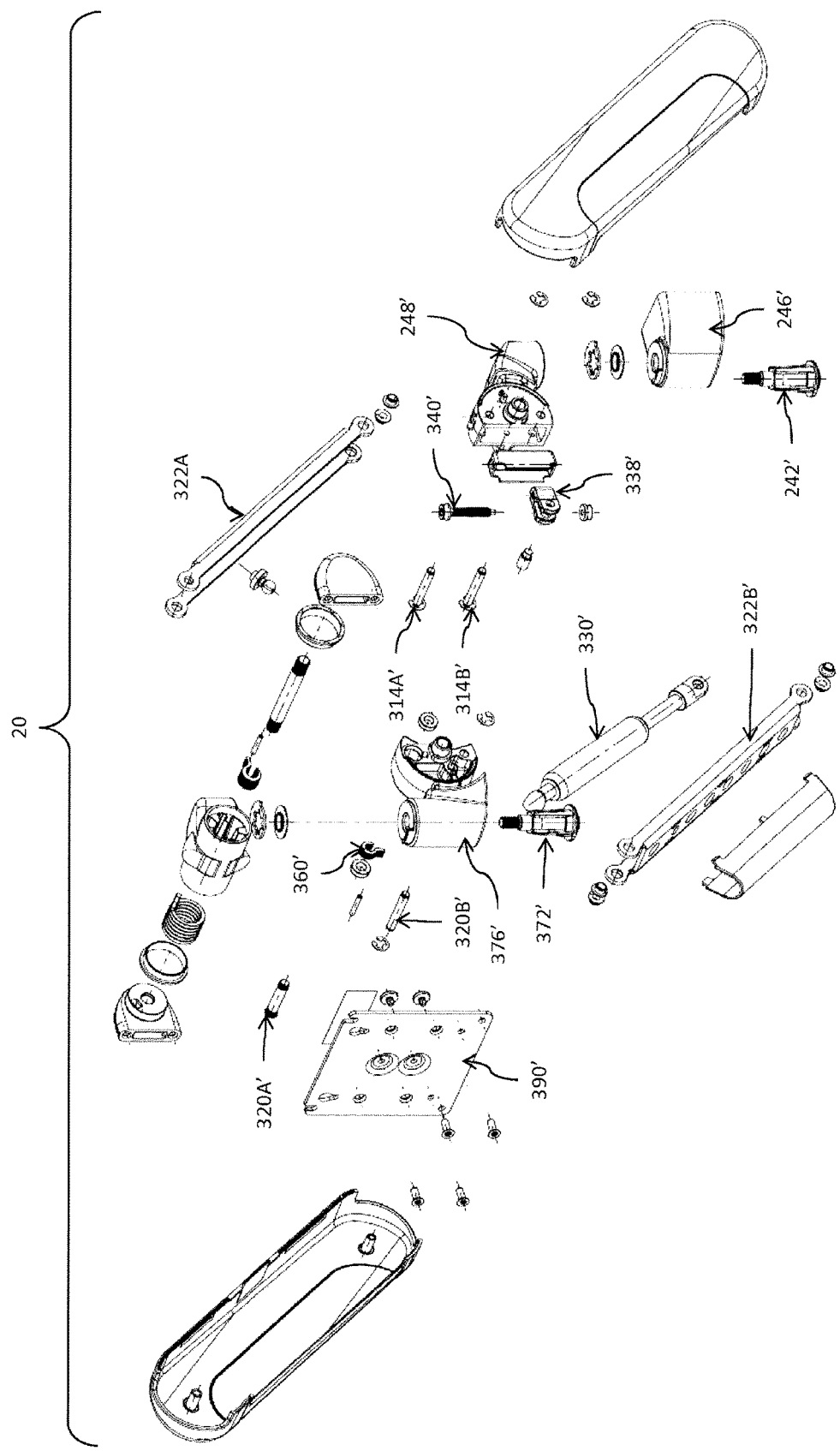
FIG. 14 is an exploded view of the display support arm assembly of FIG. 9.

Referring to FIGS. 8A and 8B, cable management system 350 includes a loop portion 354 adapted to retain a cable. Loop portion 354 is coupled to upper support arm 300 (e.g., at proximal portion 316) though side 356A and 356B. In one embodiment, however, cable management system 350 has a slot extending through at least one side 356A or 356B, such that loop portion 354 is coupled to upper support arm 300 by either 356A or 356B. Cable management system 350 advantageously provides strain relief for the cable retained within cable management system 350, e.g., by maintaining the cable near upper support arm 300. Preferably, cable management system 350 is coupled to upper support arm 300 at a location near the axis of rotation of mounting joint 370. By coupling cable management system 350 near the axis of rotation of mounting joint 370 (e.g. near axis 374 of mounting stud 372), cables retained by cable management system 350 are unlikely to wrap around mounting joint 370 as upper housing 378 is rotated with respect to lower housing 376.

Upper support arm 300 also includes an undercarriage 302 that is coupled to link 322B. Undercarriage 302 defines a passageway adapted to receive a cable. Cable management system 350 and undercarriage 302 may receive the same cable to maintain the cable near upper support arm 300, thereby facilitating rotation of upper support arm 300 with respect to lower support arm 200 without tangling of the cable around arm assembly 10.

Upper support arm 300 is coupled to mounting plate 390 by way of mounting joint 370. Mounting joint 370 is configured to permit rotation of mounting plate 390 with respect to upper support arm 300. Mounting joint 370 supports a mounting stud 372 having a longitudinal axis 374. Mounting joint 370 includes lower housing 376 and upper housing 378, which together define a cavity that houses a mounting stud 372. Mounting stud 372 may be secured within the cavity defined by lower housing 376 and upper housing 378 by any suitable means. One of either lower housing 376 or upper housing 378 may rotate with respect to mounting stud 372 around longitudinal axis 374. In one embodiment, both lower housing 376 and upper housing 378 may rotate with respect to mounting stud 372 around longitudinal axis 374. Friction elements may be coupled around mounting stud 372 to provide a friction force to resist rotation of mounting plate 390 with respect to upper support arm 300 around longitudinal axis 374.

Mounting joint 370 and mounting plate 390 are coupled together by way of connection to shaft 380, which enables mounting plate 390 to be rotated vertically around shaft 380 with respect to mounting joint 370. Torque elements 382 are disposed on shaft 380 to provide a friction force to resist rotation of mounting plate 390 around shaft 380 with respect to mounting joint 370. Preferably, torque elements 382 provides a static friction force that is equal to or greater than the weight of the display and/or object mounted to mounting plate 390.

FIGS. 9-15 illustrate additional embodiments of arm assemblies 20 and 30 for mounting a display. Arm assembly 20 is similar to arm assembly 10 (depicted in FIGS. 1A-8B), except that arm assembly 20 does not include an upper support arm and a lower support arm. Accordingly, where arm assembly 20 utilized features similar to those of arm assembly 10, reference numbers with a prime are applied. It should be understood that although similar reference numbers are utilized, various aspects of the features of arm assembly 20, e.g., size, material, etc., may be different than those described with respect to arm assembly 10.

As a general overview, arm assembly 20 includes a joint portion 240', an upper support arm 300', a mounting joint portion 370' and a mounting plate 390'.

Joint portion 240' includes lower housing 246' and upper housing 248'. Lower housing 246' and upper housing 248' together define a cavity that houses stud 242'. Lower housing 246' is configured for attachment to an object. Upper housing 248' is coupled to support arm 300'. Joint portion 240' is configured to permit rotation of support arm 300' around a longitudinal axis 244' of stud 242' with respect to lower housing 246'.

Support arm 300' includes links 322A' and 322B' extending from proximal shafts 320A' and 320B' to distal shafts 314A' and 314B'. Links 322' are coupled for pivotal movement about longitudinal axis 321' of proximal shafts 320' and/or distal shafts 314'. According to one embodiment, longitudinal axis 321A' and 321B' of shafts 320A' and 320B' remain in the same vertical plane as proximal portion 316' of support arm 300' is raised or lowered with respect to distal portion 310' of support arm 300'. In another embodiment, longitudinal axis 315A' and 315B' of shafts 314A' and 314B' remain in a single vertical plane as proximal portion 316' of support arm 300' is raised or lowered with respect to distal portion 310' of support arm 300'. Additionally or alternatively, support arm 300' may be vertically adjusted (e.g., raised or lowered) without altering the orientation of the display mount 390' and/or the proximal housing 318' with respect to the distal housing 312'. Additionally and/or alternatively, link 322A' may remain parallel to link 322B' as proximal portion 316' of support arm 300' is adjusted vertically with respect to distal portion 310' of support arm 300'.

Support arm 300' also includes a gas strut 330' and torque elements 360' to provide force throughout the range of the vertical adjustment of the arm assembly 20. The amount of resistive force provided by gas strut 330' and torque elements 360' force is adjustable by adding or subtracting the number of torque elements 360' and/or by vertically adjusting adaptor 338', which is coupled to one end of gas strut 330', along adjustment rod 340'.

Mounting joint 370' is configured to permit rotation of mounting plate 390' with respect to support arm 300'. Mounting joint 370' includes lower housing 376' and upper housing 378', which together define a cavity that houses a mounting stud 372'. One of either lower housing 376' or upper housing 378' may rotate with respect to mounting stud 372' around longitudinal axis 374', thereby enabling rotation of mounting plate 390' around mounting stud 372' with respect to support arm 300'.

Figure 15:
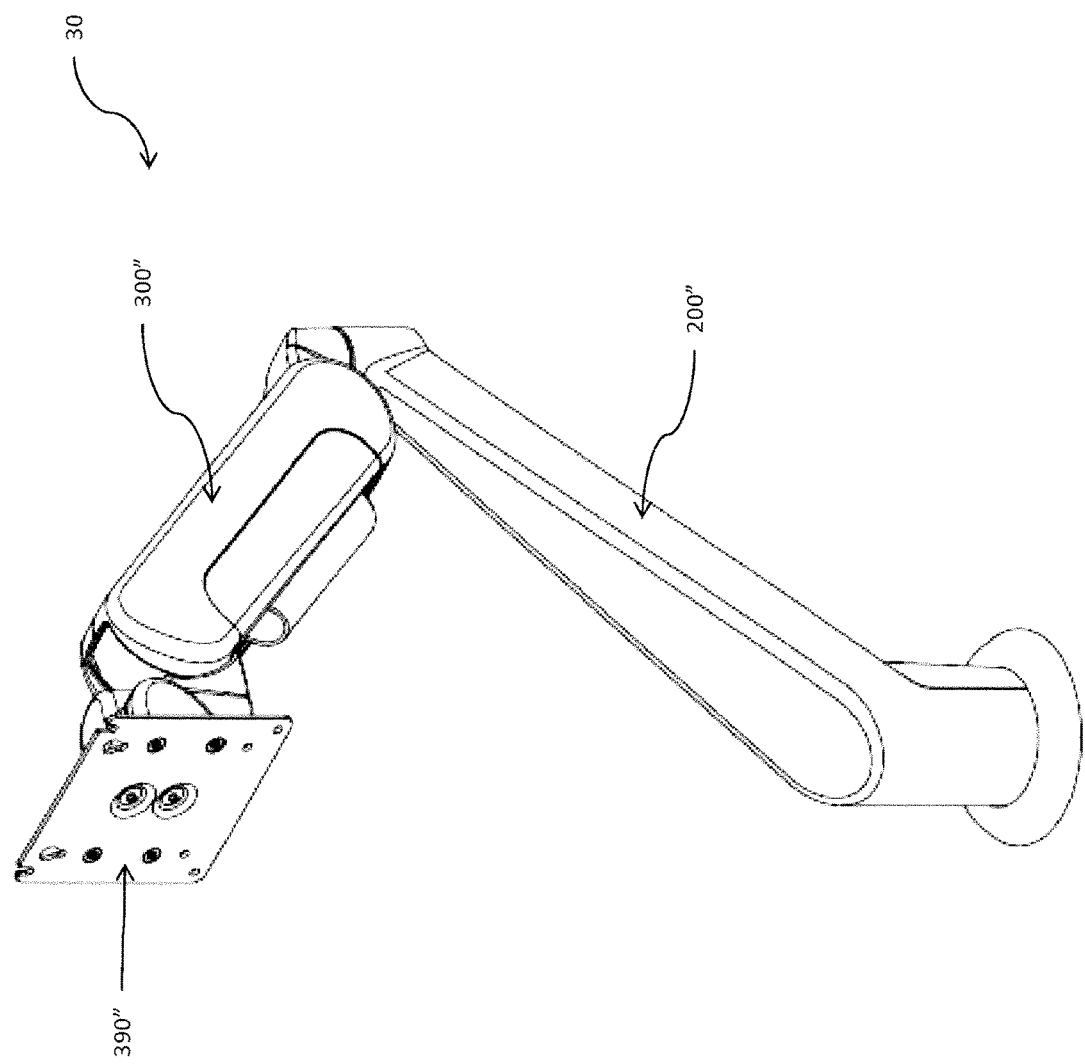
FIG. 15 is a further embodiment of a display support arm assembly in accordance with aspects of the invention.

FIG. 15 illustrates a further embodiment of an arm assembly 30 in accordance with aspects of the invention. Arm assembly 30 is similar to arm assembly 10, except that arm assembly 30 (depicted in FIG. 15) does not include a securing mechanism. Accordingly, where arm assembly 30 utilized features similar to those of arm assembly 10, reference numbers with a double prime are applied.

Arm assembly 30 includes a lower support arm 200", an upper support arm 300", and a mounting plate 390". Although lower support arm 200" and upper support arm 300" of arm assembly 30 are similar to lower support arm 200 and upper support arm 300 of arm assembly 10, lower support arm 200" of arm assembly 30 does not include a securing mechanism 250 and upper support arm 300" of arm assembly 30 does not include a cable management extension 350.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A display support arm assembly configured for vertical adjustment, the display support arm comprising:
    a proximal housing supporting at least one proximal shaft;
    a distal housing spaced from the proximal housing;
    at least one link extending from the proximal housing, the at least one link being coupled for pivotal movement relative to the proximal housing, the at least one link having a knob; and
    a gas strut extending between the proximal housing and the distal housing, the gas strut being coupled at a distal end to the knob and coupled at a proximal end to an adaptor, and
    wherein the gas strut provides a force throughout a range of the vertical adjustment of the display support arm; and
    wherein the adaptor is mounted for linear adjustability to adjust the force provided by the gas strut.

2. The display support arm assembly of claim 1, further comprising a shell coupling the adjustment rod to the distal housing, the shell retaining the adjustment rod with respect to the distal housing, wherein the shell is formed of a material that is dissimilar to a material of the distal housing.

3. The display support arm assembly of claim 2, wherein the material of the shell is more flexible than the material of the distal housing.

4. The display support arm assembly of claim 3, wherein the shell is formed of a polymer material.

5. The display support arm assembly of claim 4, wherein the distal housing is formed of a metallic material.

6. The display support arm assembly of claim 2, wherein the shell is disposed within a cavity in the distal housing.

7. The display support arm assembly of claim 6, wherein the shell is secured within the cavity by press fitting the shell at least partially within the cavity.

8. The display support arm assembly of claim 6, wherein the adjustment rod does not contact the distal housing.

9. The display support arm assembly of claim 8, wherein the distal housing defines an opening providing access to the adjustment rod, and the shell defines an opening providing access to the adjustment rod that aligns with the opening of the distal housing.

\* \* \* \* \*